United States Patent
Shetty et al.

(10) Patent No.: US 9,869,792 B2
(45) Date of Patent: Jan. 16, 2018

(54) INVERSION-BASED WORKFLOW FOR PROCESSING NUCLEAR DENSITY IMAGES IN HIGH-ANGLE AND HORIZONTAL WELLS

(71) Applicant: SCHLUMBERGER TECHNOLOGY CORPORATION, Sugar Land, TX (US)

(72) Inventors: Sushil Shetty, Arlington, MA (US); Dzevat Omeragic, Lexington, MA (US); Tarek M. Habashy, Burlington, MA (US); John Rasmus, Richmond, TX (US); Jeffrey Miles, Ar, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 127 days.

(21) Appl. No.: 14/352,566

(22) PCT Filed: Oct. 24, 2012

(86) PCT No.: PCT/US2012/061585
§ 371 (c)(1),
(2) Date: Apr. 17, 2014

(87) PCT Pub. No.: WO2013/066682
PCT Pub. Date: May 10, 2013

(65) Prior Publication Data
US 2014/0286539 A1    Sep. 25, 2014

Related U.S. Application Data

(60) Provisional application No. 61/553,810, filed on Oct. 31, 2011.

(51) Int. Cl.
*G06K 9/00* (2006.01)
*G01V 5/12* (2006.01)
*G01V 5/08* (2006.01)

(52) U.S. Cl.
CPC . *G01V 5/12* (2013.01); *G01V 5/08* (2013.01)

(58) Field of Classification Search
None
See application file for complete search history.

(56) References Cited

U.S. PATENT DOCUMENTS 5,831,935 A * 11/1998 Luo .................... G01V 1/32
367/47
6,308,136 B1 * 10/2001 Tabarovsky ............ G01V 3/28
285/124.1

(Continued)

FOREIGN PATENT DOCUMENTS

EP    0499940 A1    8/1992

OTHER PUBLICATIONS

Passey, Quinn R., et al. "Overview of high-angle and horizontal well formation evaluation: issues, learnings, and future directions." SPWLA 46th Annual Logging Symposium. Society of Petrophysicists and Well-Log Analysts, 2005.*

(Continued)

*Primary Examiner* — Sean Conner
(74) *Attorney, Agent, or Firm* — Lam Nguyen; Jay Sbrollini

(57) ABSTRACT

Methods and apparatus for characterizing a subterranean formation traversed by a wellbore including collecting data from the formation using a tool wherein the tool collects data to form an azimuthal image, characterizing a section of the formation comprising data and images acquired in a high angle wellbore section or horizontal wellbore section using a parametric model, and performing an inversion using (Continued)

apparent densities and volumetric photoelectric factor images to build a formation model wherein the inversion is tailored for high angle wellbore sections and/or horizontal wellbore sections.

22 Claims, 39 Drawing Sheets

(56) References Cited

U.S. PATENT DOCUMENTS

| | | | |
|---|---|---|---|
| 7,279,677 B2 | 10/2007 | Ellis et al. | |
| 8,433,518 B2 | 4/2013 | Omeragic et al. | |
| 8,754,651 B2 | 6/2014 | Habashy et al. | |
| 9,057,797 B2 | 6/2015 | Omeragic et al. | |
| 2004/0257240 A1* | 12/2004 | Chen | G01V 3/38 340/853.1 |
| 2007/0038375 A1* | 2/2007 | Jalali | E21B 49/008 702/6 |
| 2009/0093962 A1 | 4/2009 | Akkurt et al. | |
| 2009/0204327 A1* | 8/2009 | Lu | G01V 3/083 702/7 |
| 2010/0004867 A1* | 1/2010 | Zhou | G01V 5/101 702/8 |
| 2010/0312478 A1* | 12/2010 | Tabanou | G01V 11/00 702/7 |
| 2011/0077867 A1 | 3/2011 | Evans et al. | |
| 2011/0168879 A1 | 7/2011 | Evans et al. | |
| 2012/0095688 A1* | 4/2012 | Dorovsky | G01V 11/007 702/12 |
| 2012/0243368 A1* | 9/2012 | Geiser | G01V 1/42 367/9 |
| 2013/0046474 A1* | 2/2013 | Bittar | G01V 3/10 702/7 |
| 2013/0054145 A1* | 2/2013 | Bittar | G01V 3/30 702/7 |
| 2013/0080058 A1* | 3/2013 | Wu | G01V 1/42 702/7 |

OTHER PUBLICATIONS

Ellis, D. and Singer, J. Well Logging for Earth Scientists. 2007. Springer Netherlands. pp. 573-595.*

Habashy, et al., "A general framework for constraint minimization for the inversion of electromagnetic measurements", Progress in Electromagnetics Research, vol. 46, 2004, pp. 265-312.

Mendoza, et al., "Inversion of Sector-Based LWD Density Measurements Acquired in Laminated Sequences Penetrated by Highangle and Horizontal Wells", SPWLA 50th Annual Logging Symposium, The Woodlands, Texas, Jun. 21-24, 2009, 16 pages.

Griffiths, "Well Placement Fundamentals", ISBN-10: 0978853040, Schlumberger, Jan. 1, 2009, pp. 22-25.

Simsek, et al., "Analysis of noncircular fluid-filled boreholes in elastic formations using a perturbation model", The Journal of the Acoustical Society of America, vol. 124, No. 1, Jul. 2008, pp. 213-217.

International Search Report and Written Opinion issued in PCT/US2012/061585 dated Mar. 14, 2013, 10 pages.

Omeragic, et al., "Real-Time Interpretation of Formation Structure From Directional EM Measurements", SPWLA 47th Annual Logging Symposium, Jun. 4-7, 2016, 14 pages.

* cited by examiner

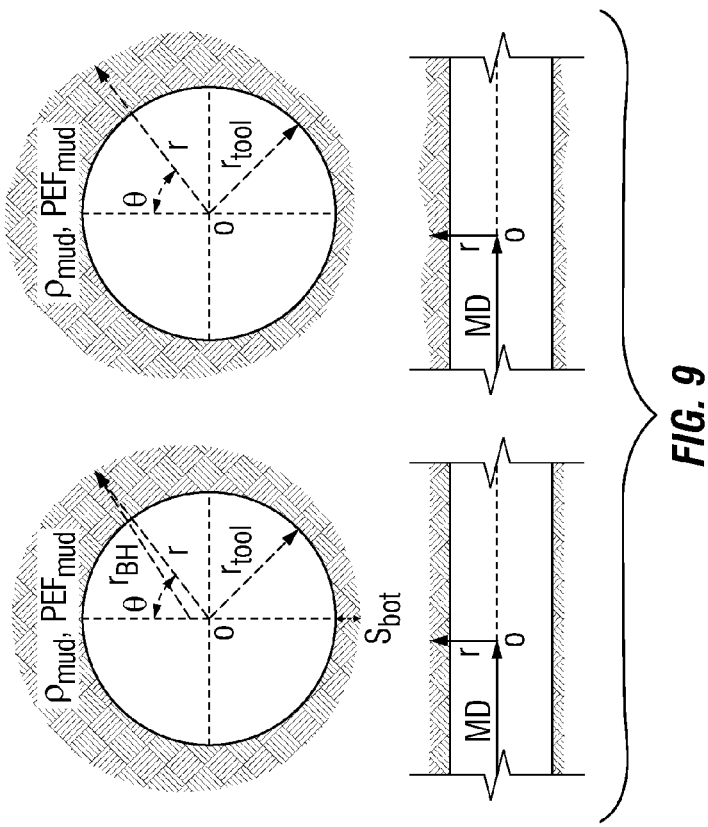
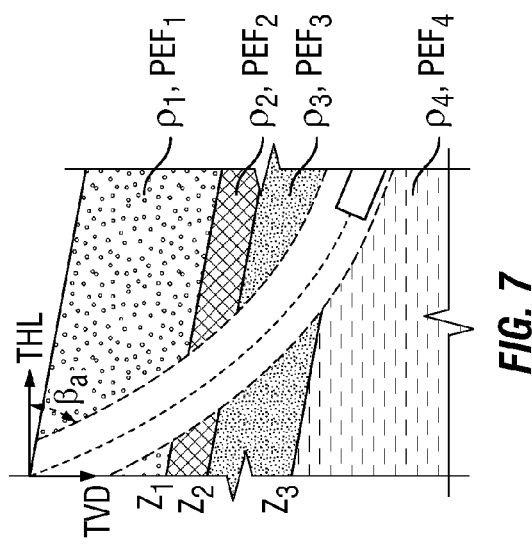
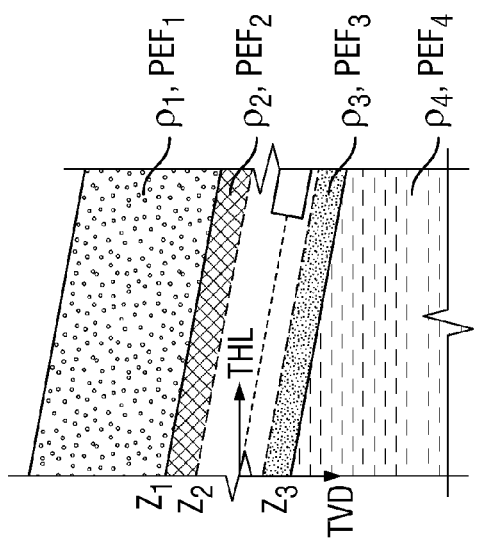
FIG. 9
FIG. 7
FIG. 8

INVERSION-BASED WORKFLOW FOR PROCESSING NUCLEAR DENSITY IMAGES IN HIGH-ANGLE AND HORIZONTAL WELLS

CROSS-REFERENCE TO RELATED APPLICATIONS

This application is a U.S. National Stage Application under 35 U.S.C. § 371 and claims priority to Patent Cooperation Treaty Application No. PCT/US2012/061585 filed Oct. 24, 2012, which claims the benefit of U.S. Provisional Patent Application Ser. No. 61/553,810, filed Oct. 31, 2011, both of which are incorporated herein by reference in their entireties.

BACKGROUND

Formation evaluation in high-angle and horizontal (HA, HZ) wells is still a challenge due to measurement complexity, environmental effects and lack of adequate interpretation answer products. The effects of bed boundary crossings at high angles, influence of adjacent bed above and below the wellbore, as well as anisotropy were recognized on all the measurements. In case of resistivity interpretation, these effects made it impossible for the petrophysicists to use any of resistivity measurements as a direct representation of $R_t$ over the intervals where the effects are present. It is necessary to model the tool response in order to determine the individual layer $R_t$, or to compare directly the offset well values for correlation and infer an $R_t$ for petrophysics. Development of directional measurements significantly increased the potential to accurately characterize formation structure near the wellbore, correct the effects of adjacent boundaries and made possible use of inversion to build more accurate 2D or 3D formation models.

Nuclear density measurements progressed from designs focused on measuring an average density for vertical wells to a fully azimuthal measurement for inclined wells. While being a shallower measurement than the resistivity, the nuclear density is also affected by bed crossings and adjacent beds, and additionally by standoff and asymmetric ("teardrop") invasion.

Traditionally, modeling of the nuclear tool responses relies on Monte Carlo Nuclear Particle (MCNP) modeling codes that are computationally intensive and not suitable for log analysis. They are primarily used in the tool design process to optimize the sensitivity and accuracy of the measurement and to develop cross-plots, correction charts and case studies to better understand responses in complex scenarios.

The first quantitative inversion-based interpretation of nuclear density images was developed using a fast-forward model based on linear approximation and 2D flux sensitivity functions. The methodology ignores the borehole and determines the initial formation model using only the bottom quadrant data where the standoff is generally negligible. Based on the dip extracted from image sinusoids, the technique is able to build a 1D layered earth model of formation density in high-angle wells. However, its applicability is limited due to the limitations of 2D (axisymmetric) assumption, and the loss of information from not using data from all sectors. The same constraint severely limits the applicability to horizontal wells, where the image usually does not contain sinusoids, and use of bottom sector data is not sufficient in automated interpretation workflows due to variation of dip and effects of adjacent (non-crossed) layers.

SUMMARY

Embodiments herein relate to apparatus and methods for characterizing a subterranean formation traversed by a wellbore including collecting data from the formation using a tool wherein the tool collects data to form an azimuthal image, characterizing a section of the formation comprising data and images acquired in a high angle wellbore section or horizontal wellbore section using a parametric model, and performing an inversion using apparent densities and volumetric photoelectric factor images to build a formation model wherein the inversion is tailored for high angle wellbore sections and/or horizontal wellbore sections.

FIGURES

FIG. 7 is a schematic drawing of the high-angle well model parameterization, including set of dipping layers with trajectory of varying inclination, strictly up-section or down-section. Arbitrary borehole geometry is represented with dashed lines.

FIG. 8 is a schematic drawing of the horizontal well model parameterization, including set of layers parallel with the tool at arbitrary azimuth. The borehole is represented with dashed lines; its geometry is defined separately.

FIG. 9 is a schematic drawing of a borehole model parameterization: (a) cylindrical geometry and (b) arbitrary geometry. Geometry in plane perpendicular to tool axis (upper panel) and plane containing tool axis (lower panel).

Figure 12:
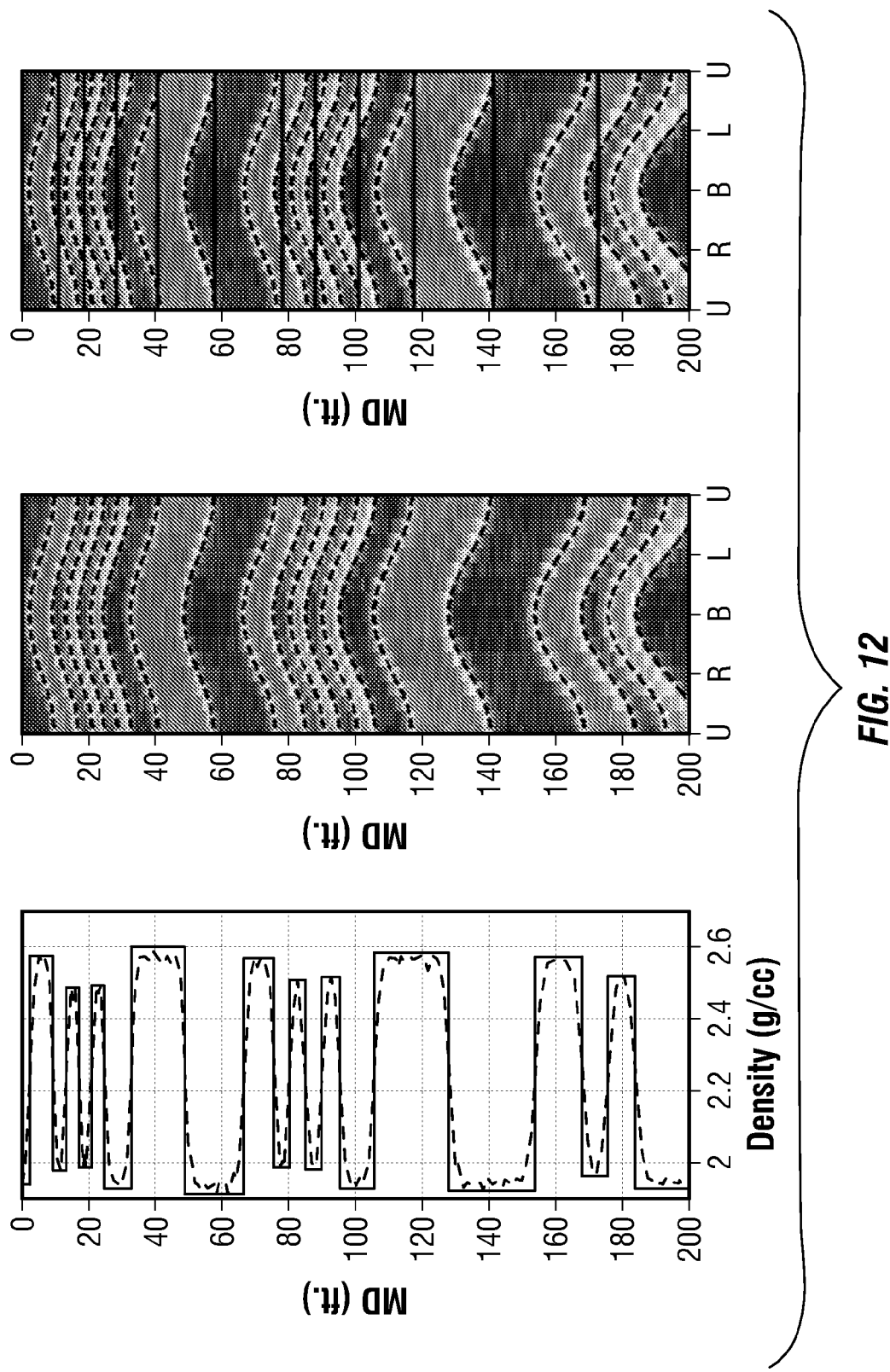

FIG. 12 is a composite figure for high-angle well preprocessing for noisy synthetic data: bottom COMP squaring (red curve) produced a density profile (blue) (left); Sinusoid extraction from COMP image (dashed black curves) (middle); Adaptive segmentation (solid black lines) (right).

Figure 13:
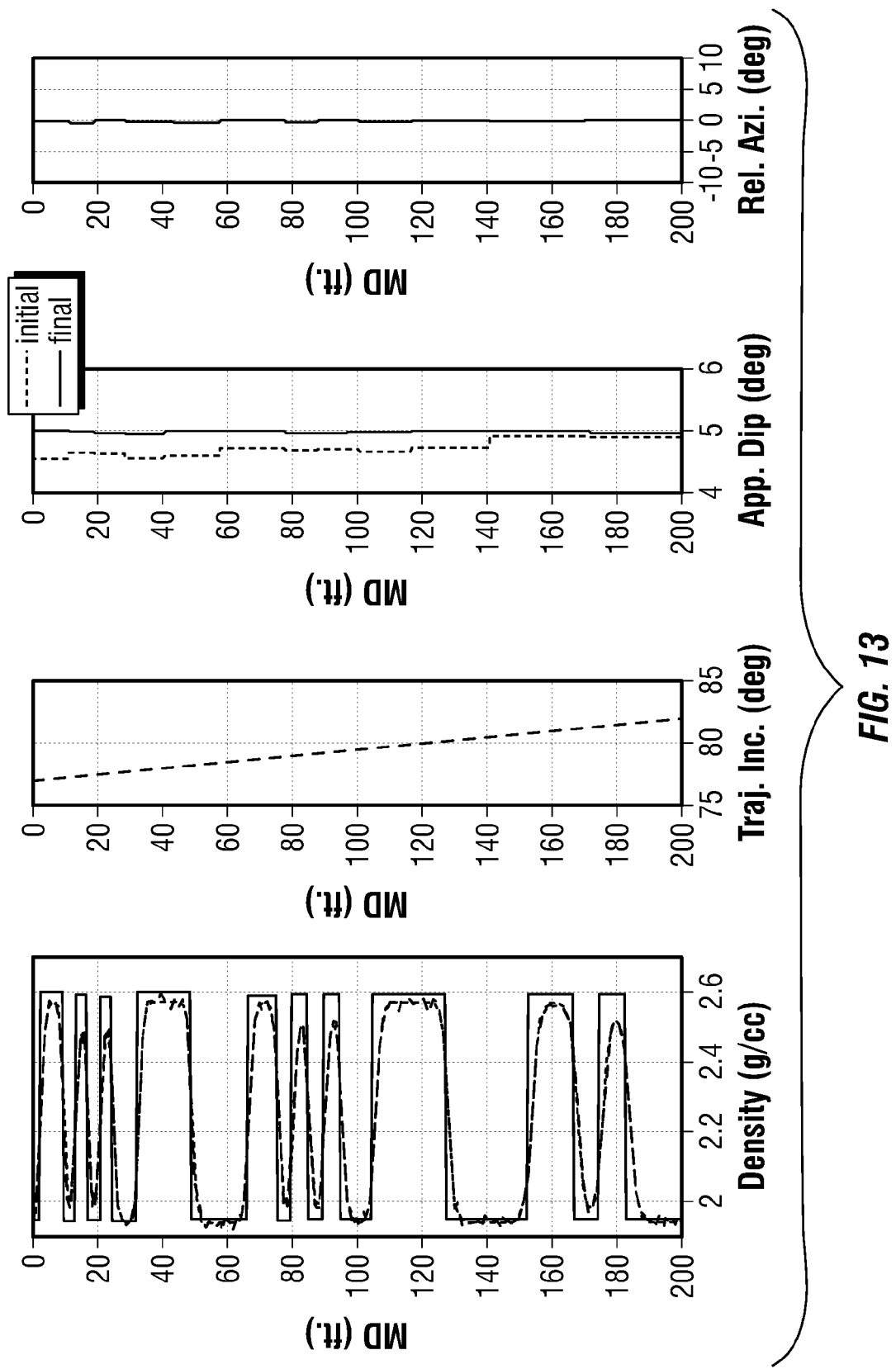

FIG. 13 is a composite figure for high-angle inversion of noisy synthetic data-set: final layer profile (blue) and COMP bottom quadrant log (measured—red, reconstructed—green), (left); trajectory inclination, initial and final dip, and azimuth (right).

Figure 14:
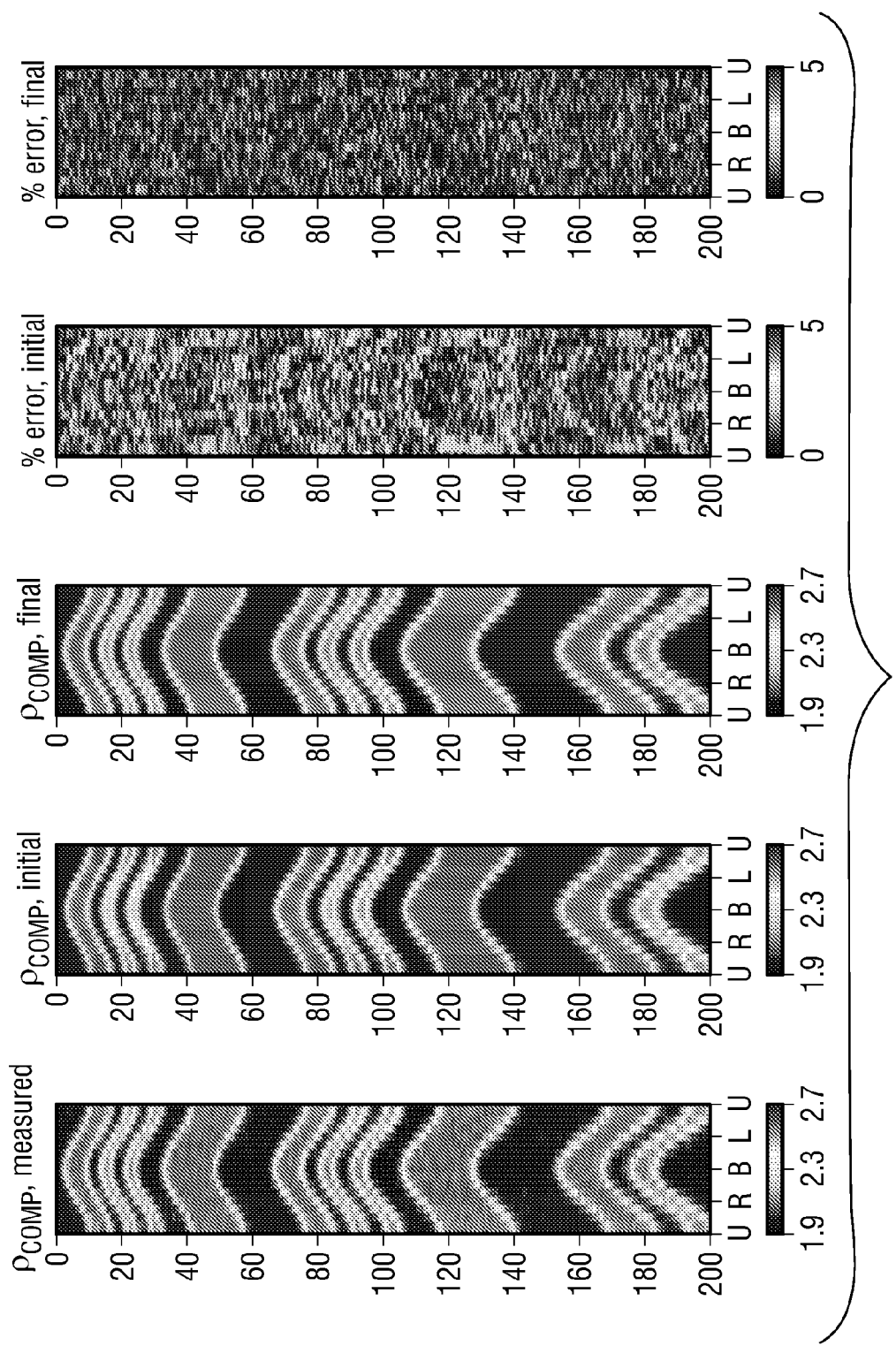

FIG. 14 is a composite figure for reconstruction of COMP image for high-angle inversion of noisy synthetic data-set with relative dip variation 82° to 87°.

Figure 15:
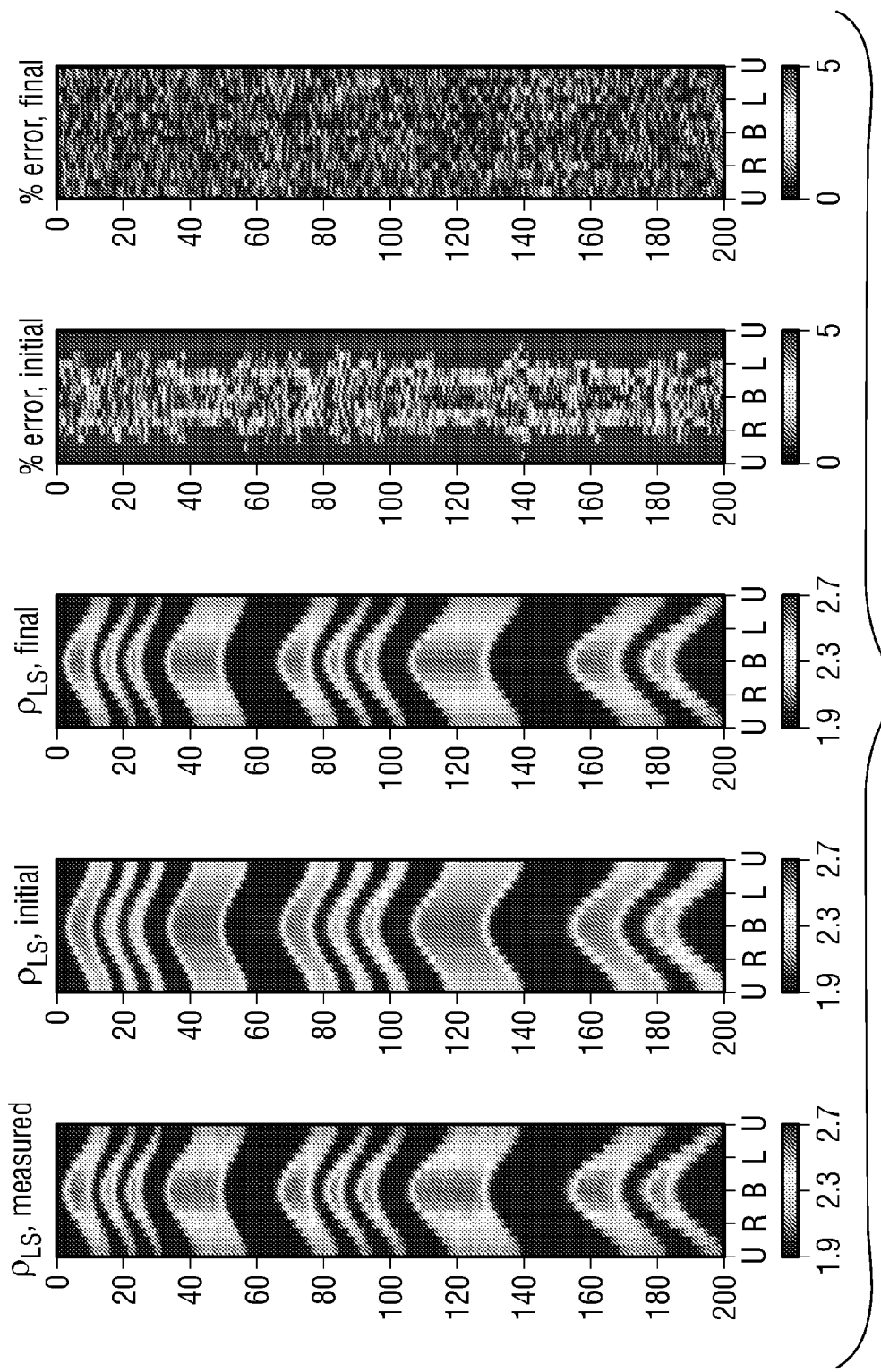

FIG. 15 is a composite figure for reconstruction of LS image for high-angle inversion of noisy synthetic data-set with relative dip variation 82° to 87°.

Figure 16:
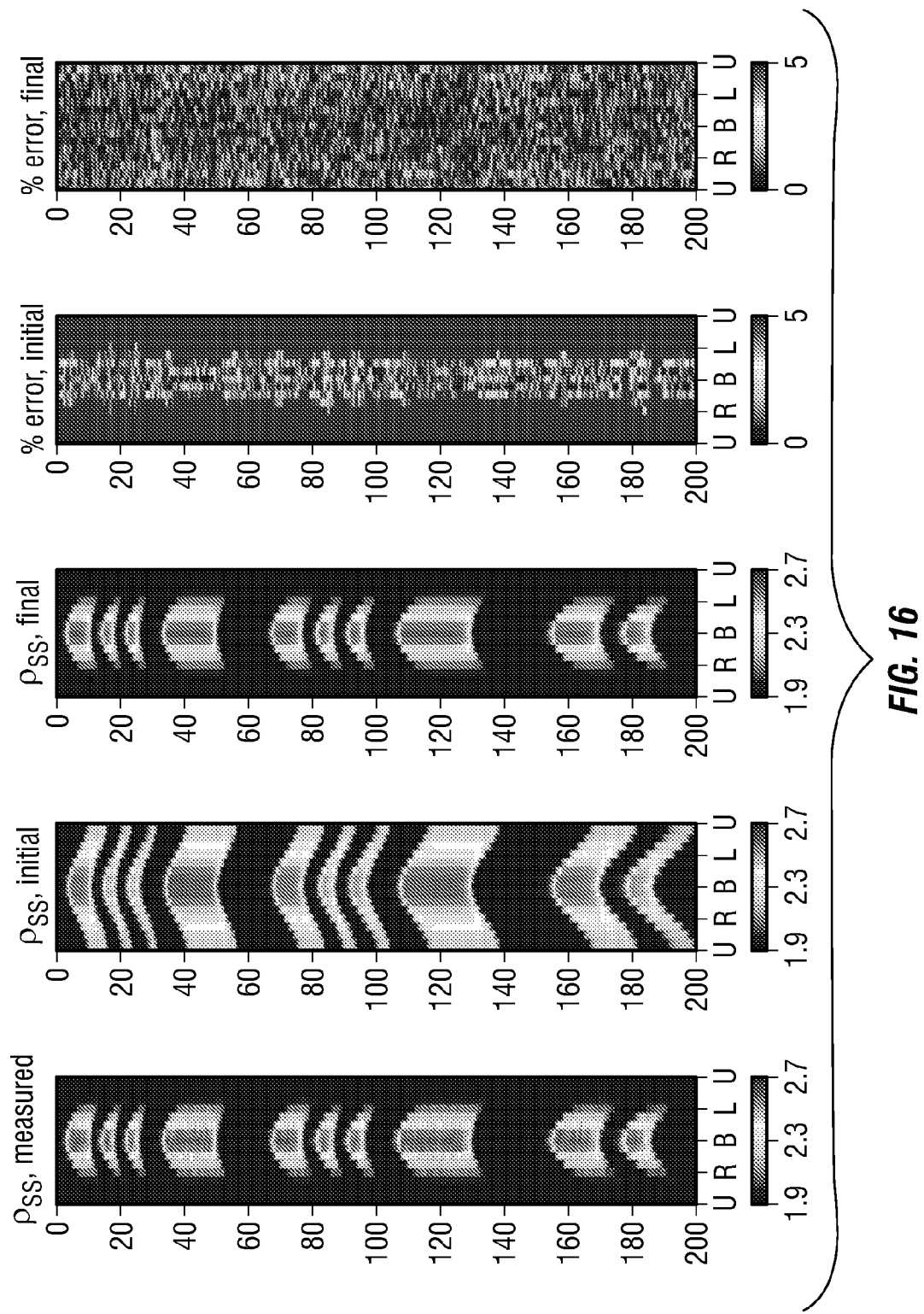

FIG. 16 is a composite figure for reconstruction of SS image for high-angle inversion of noisy synthetic data-set with relative dip variation 82° to 87°.

Figure 17:
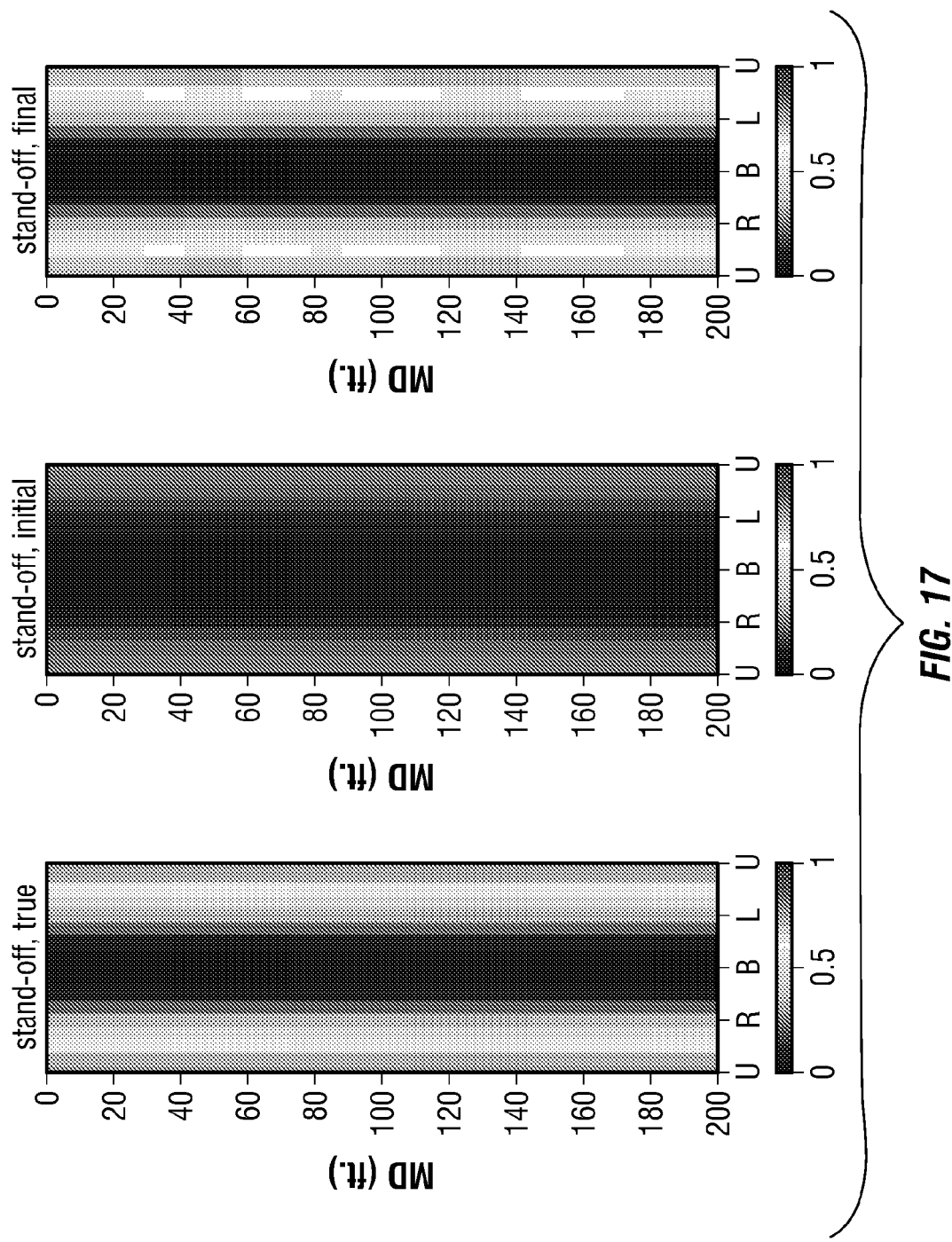

FIG. 17 is a composite figure for borehole geometry (stand-off in inches) for high-angle inversion of noisy synthetic data: true geometry (left), initial geometry (middle), and final geometry from the inversion (right).

Figure 18:
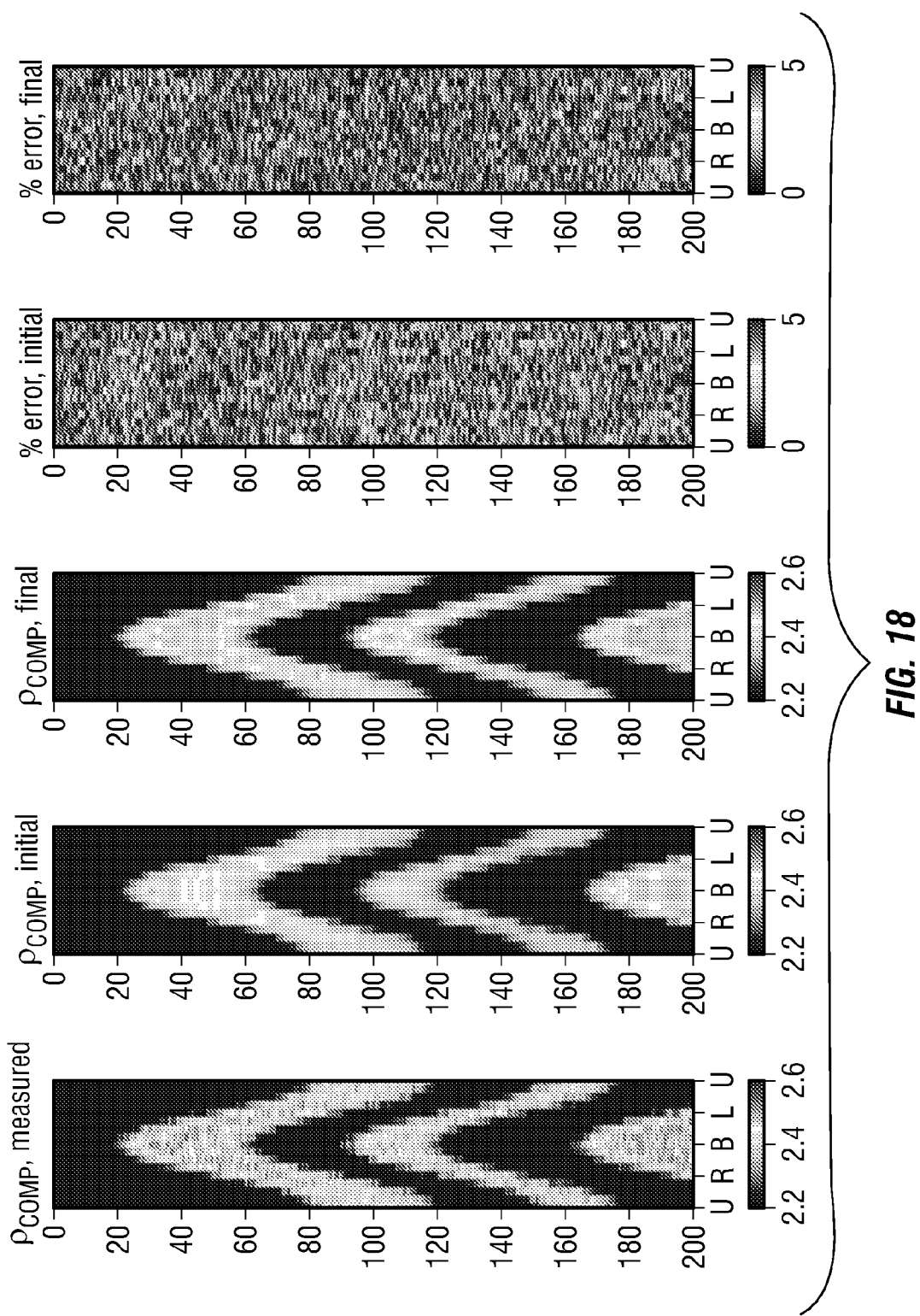

FIG. 18 is a composite figure for reconstruction of COMP image for horizontal well inversion of noisy synthetic data-set with constant 89° relative dip.

Figure 19:
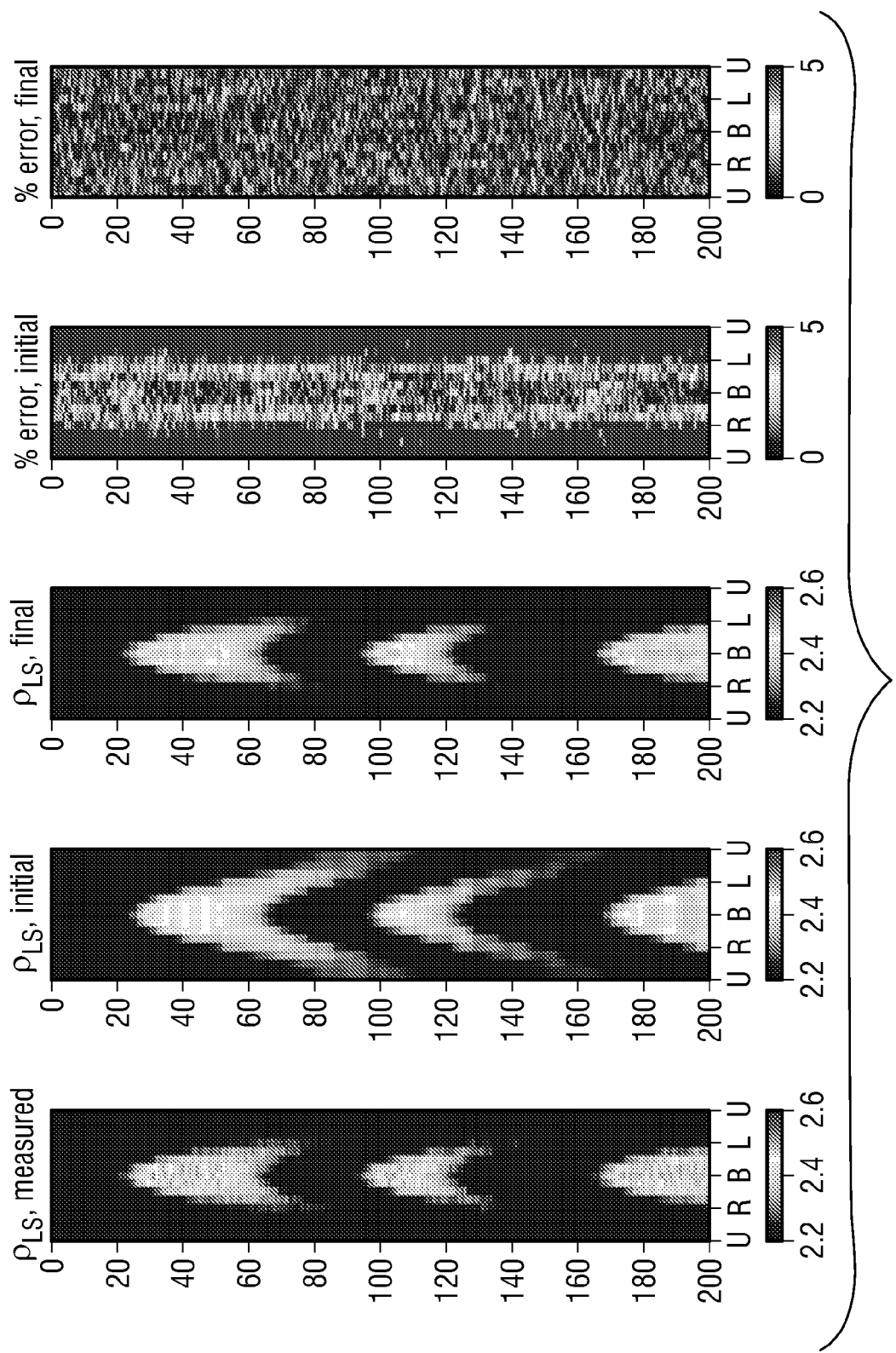

FIG. 19 is a composite figure for reconstruction of LS image for horizontal well inversion of noisy synthetic data-set with constant 89° relative dip.

Figure 20:
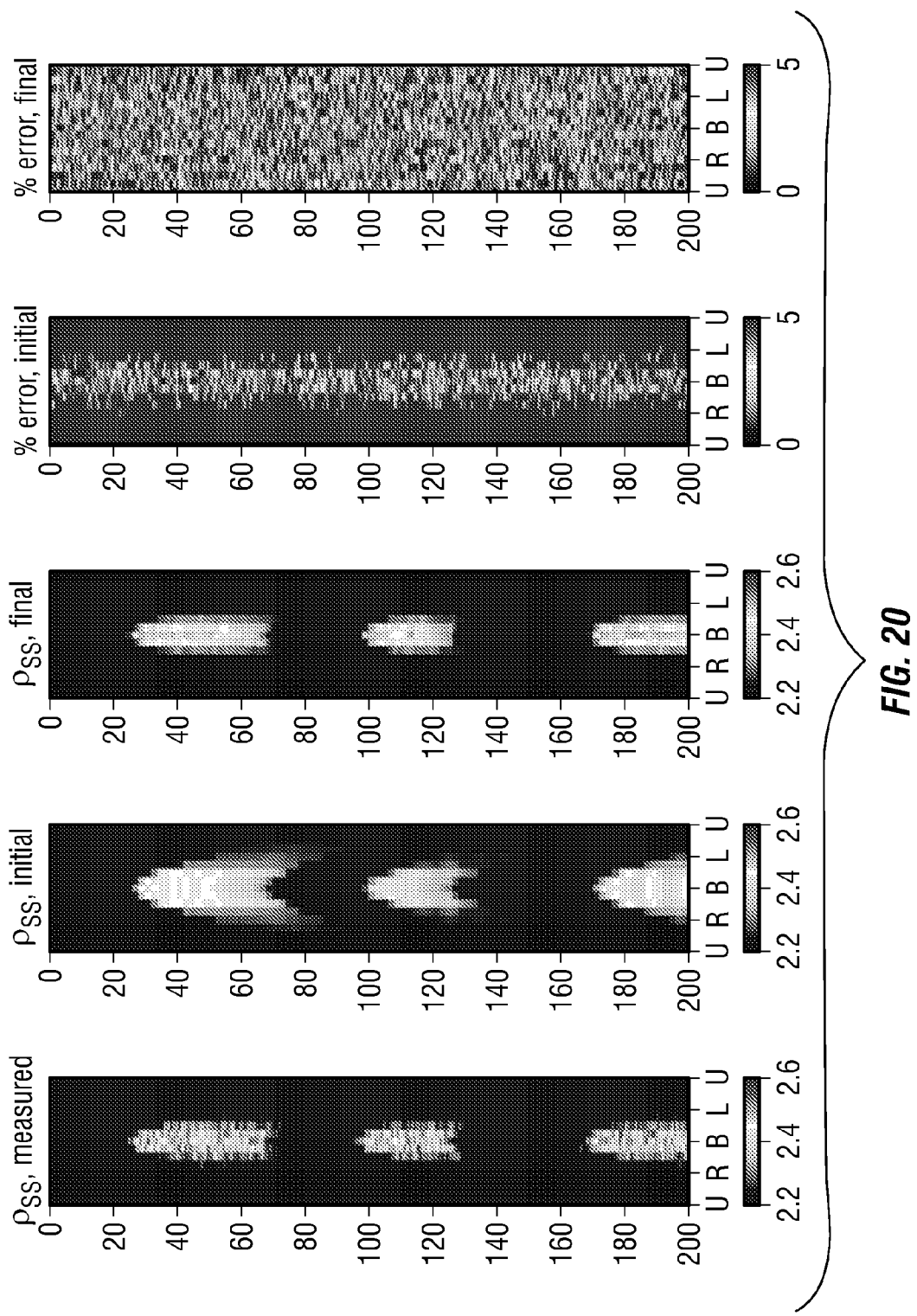

FIG. 20 is a composite figure for reconstruction of SS image for horizontal well inversion of noisy synthetic data-set with constant 89° relative dip.

Figure 21:
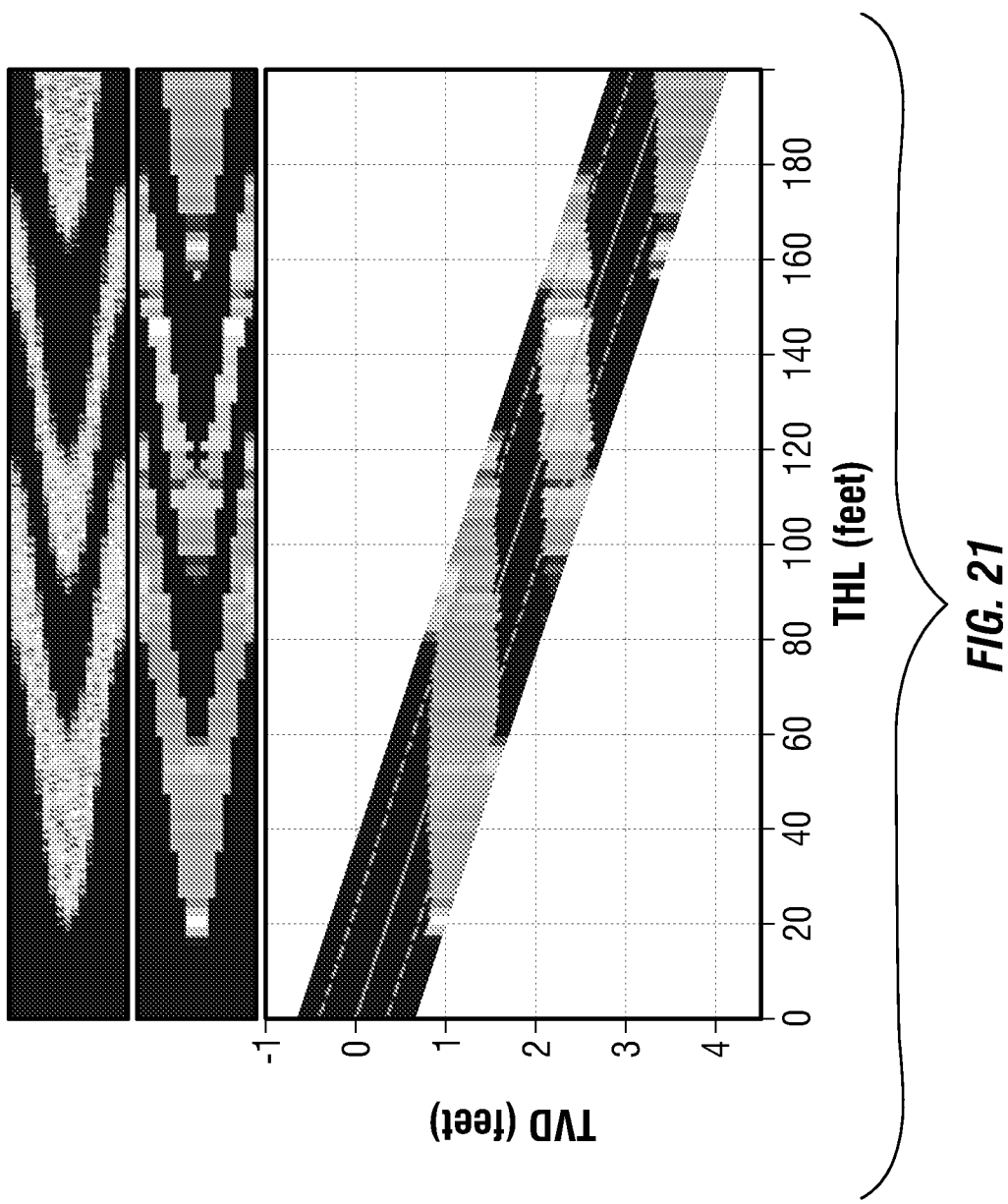

FIG. 21 is a composite figure for horizontal well inversion of noisy synthetic data (rel. dip 89°): Measured COMP image (top), final borehole-corrected image (middle), and final formation model in curtain-section plane (bottom). The green curves represent trajectory and the borehole surfaces.

Figure 22:
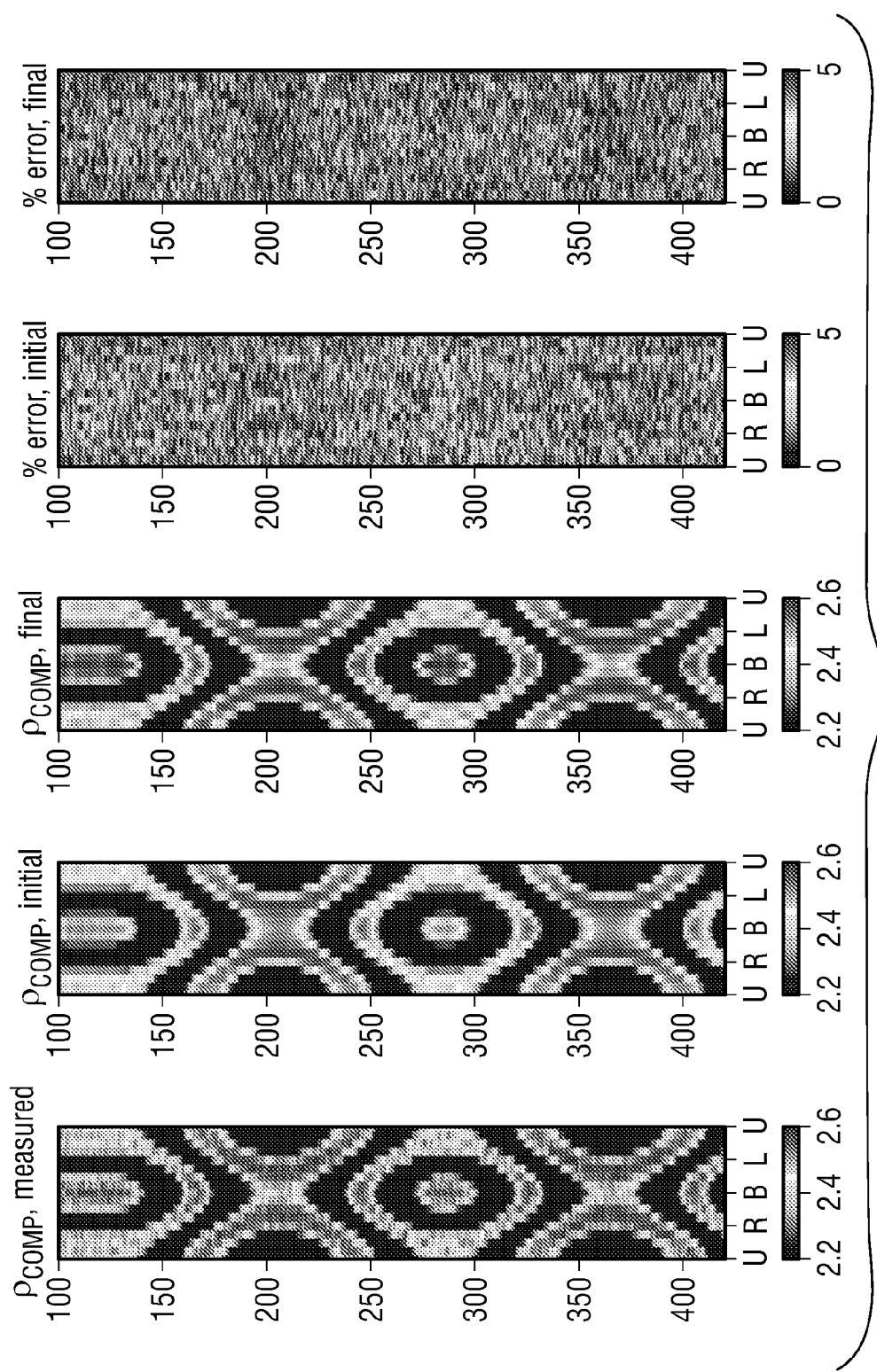

FIG. 22 is a reconstruction of COMP image for horizontal well inversion of noisy synthetic data-set with sinusoidal relative dip in the range 88°-92°.

Figure 23:
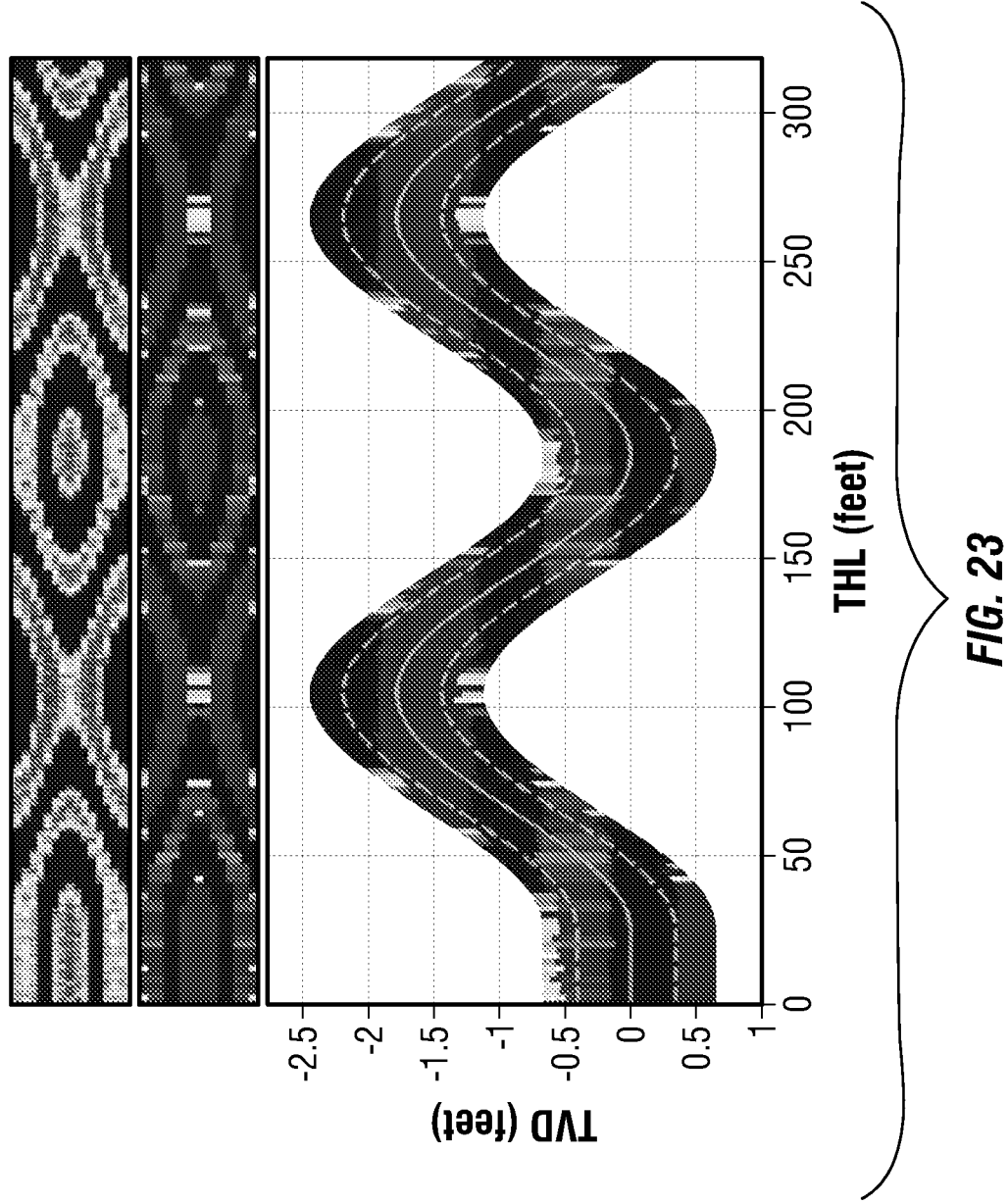

FIG. 23 is a horizontal well inversion of noisy synthetic data with variable rel. dip 88°-92°: Measured COMP image (top), final borehole-corrected image (middle), and final formation model in curtain-section plane (bottom). The green curves represent trajectory and the borehole surfaces.

Figure 24:
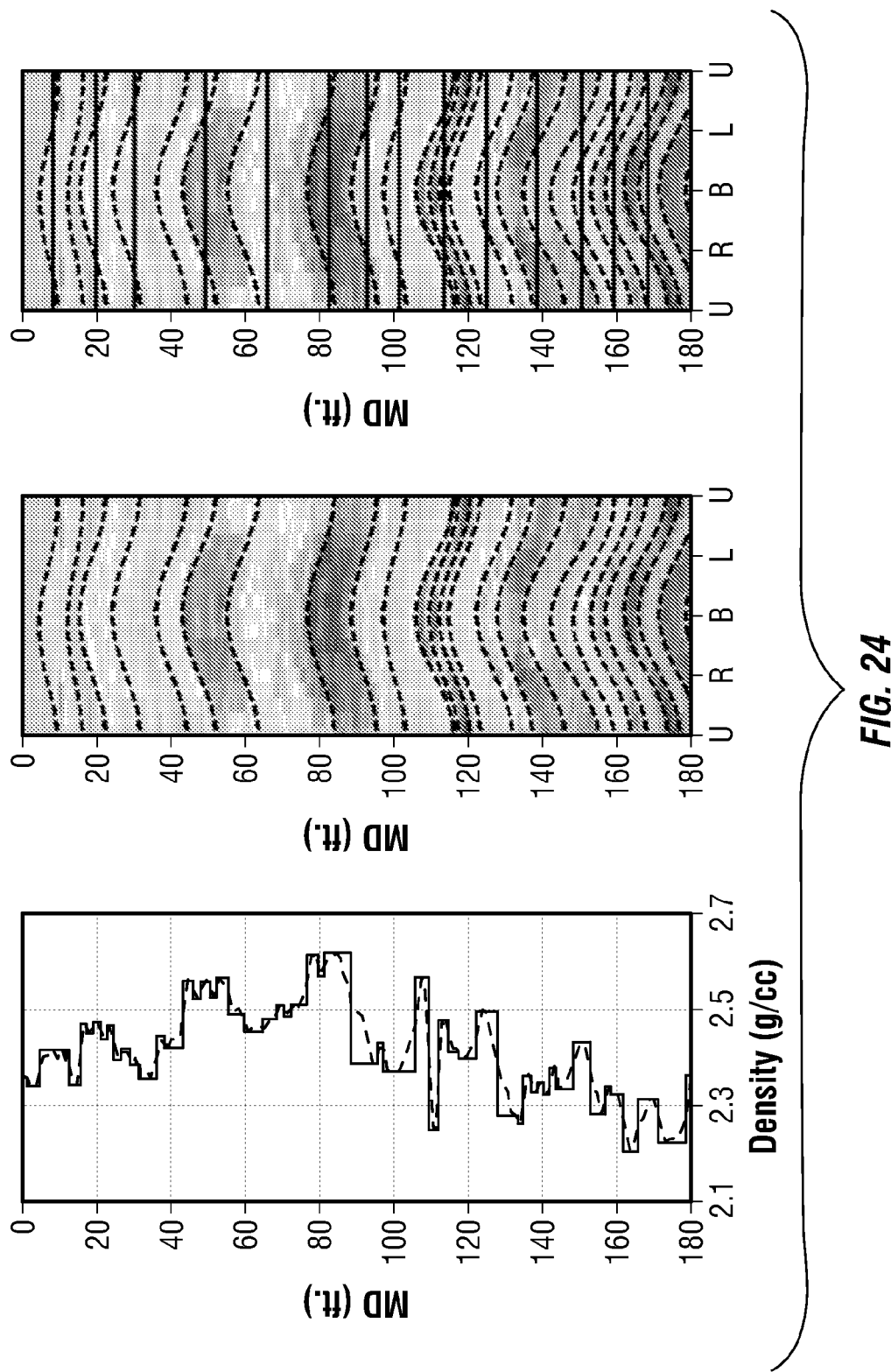

FIG. 24 is a composite figure illustrating high-angle well pre-processing of the field data: bottom quadrant COMP squaring (red curve) produced a density profile (blue) (left); Sinusoid extraction from COMP image (dashed black curves) (middle); Adaptive segmentation (solid black lines) (right).

Figure 25:
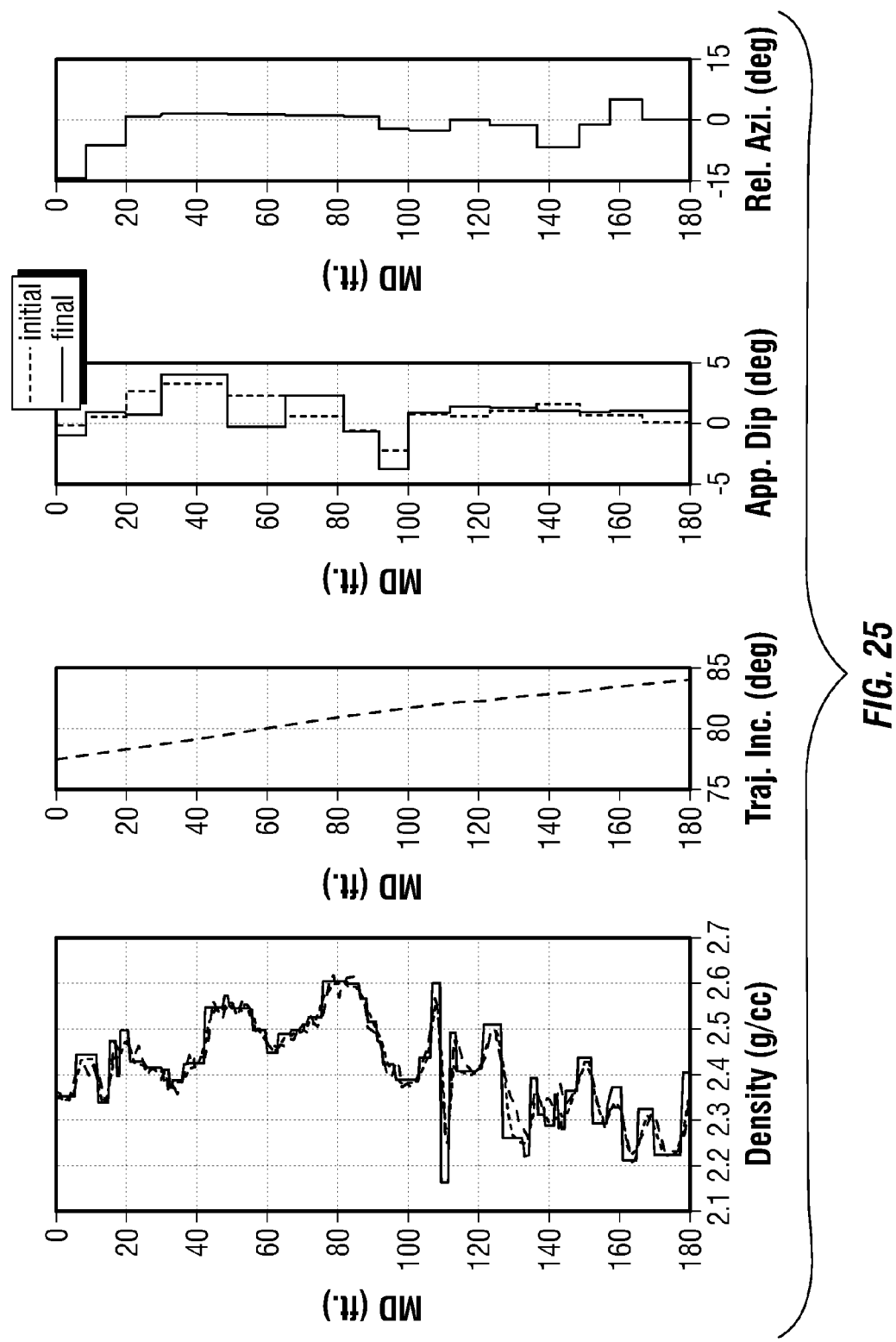

FIG. 25 is a high-angle inversion of field data: Inverted density profile (blue), bottom quadrant COMP measurements (red) reconstructed (green); Trajectory inclination, initial and final apparent dip, and relative azimuth (right).

Figure 26:
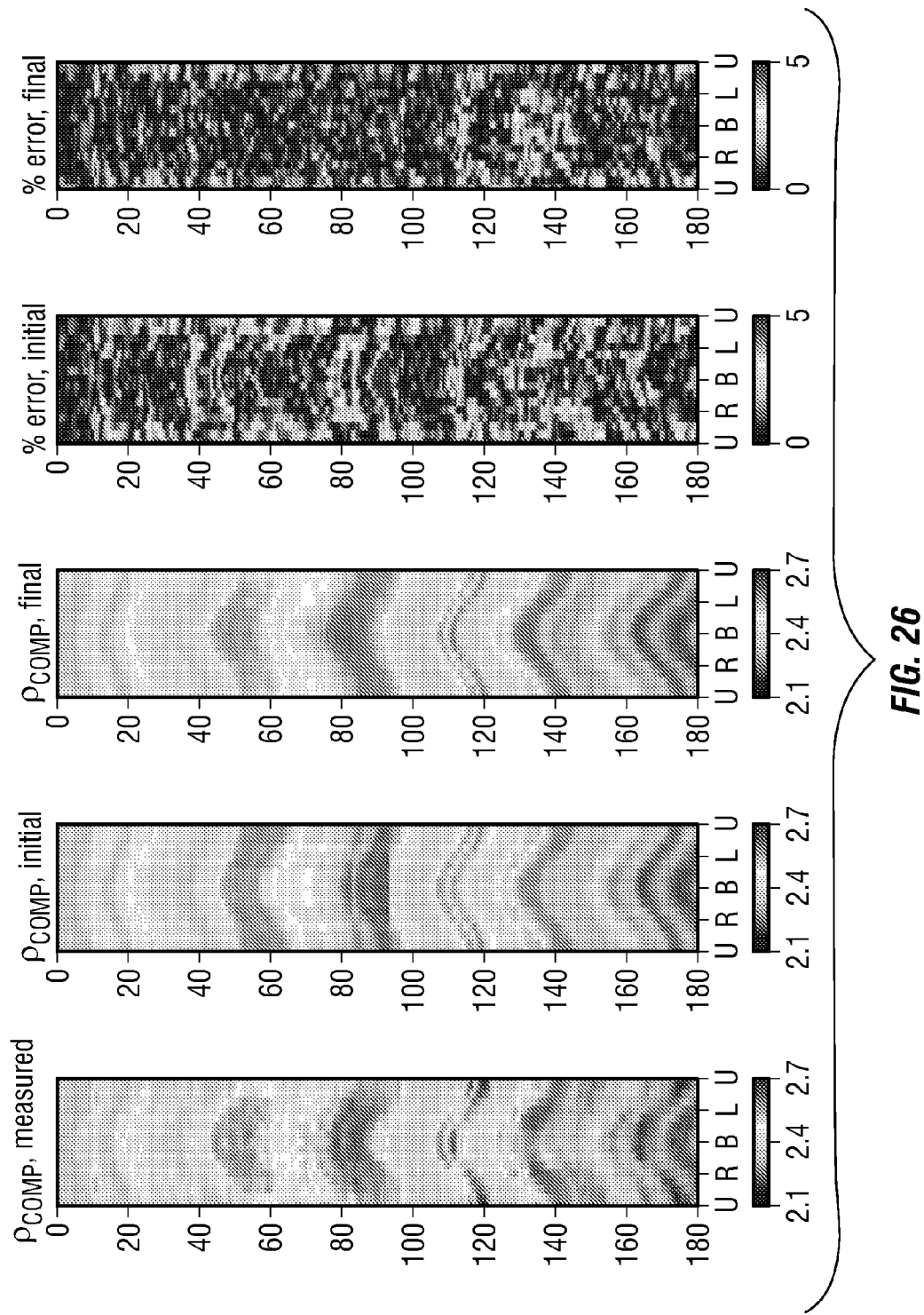

FIG. 26 is a composite figure of reconstruction of COMP image for high-angle well inversion of interval from North Sea field data-set.

Figure 27:
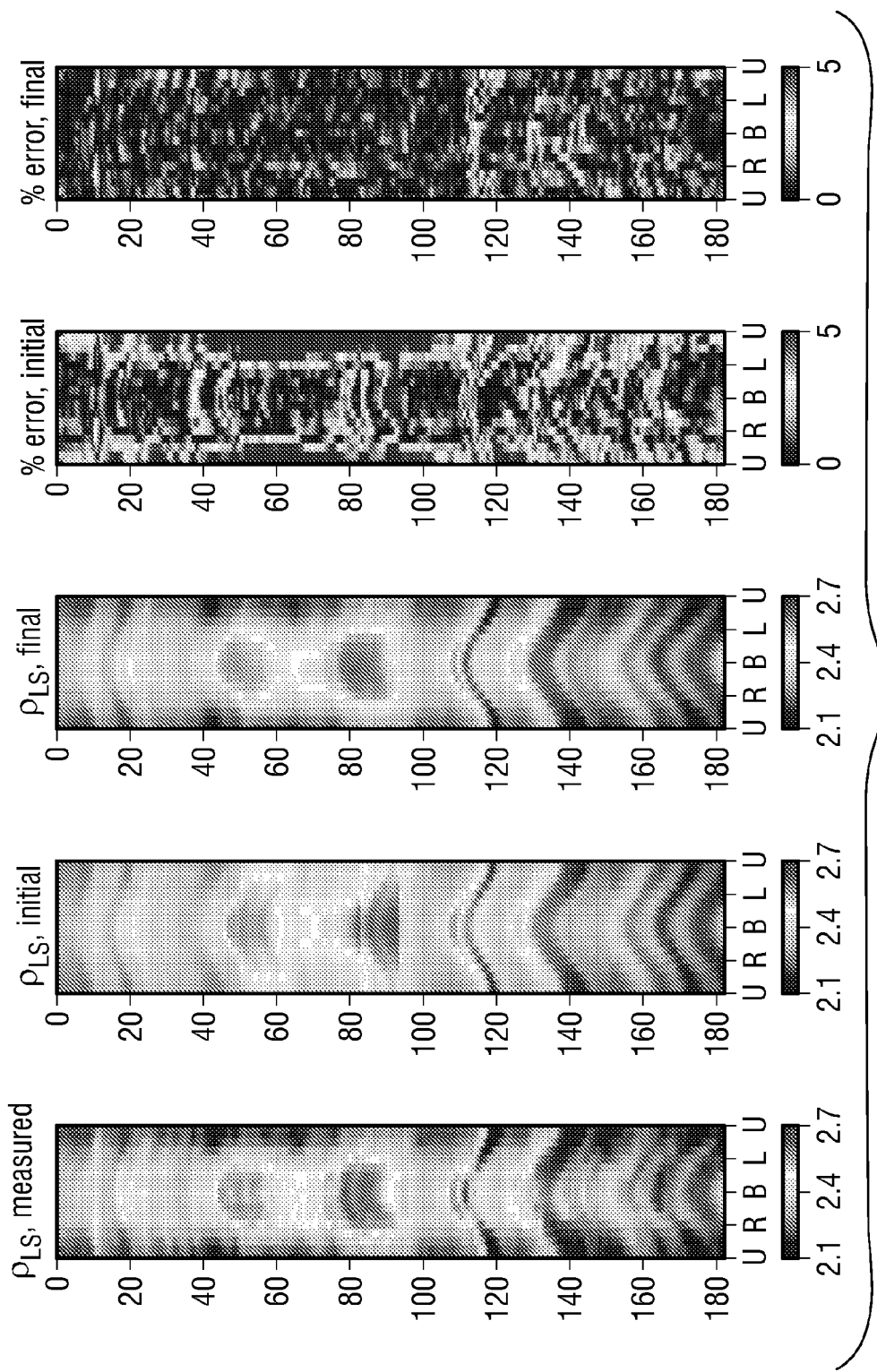

FIG. 27 is a composite figure of reconstruction of LS images for high-angle well inversion of interval from North Sea field data-set.

Figure 28:
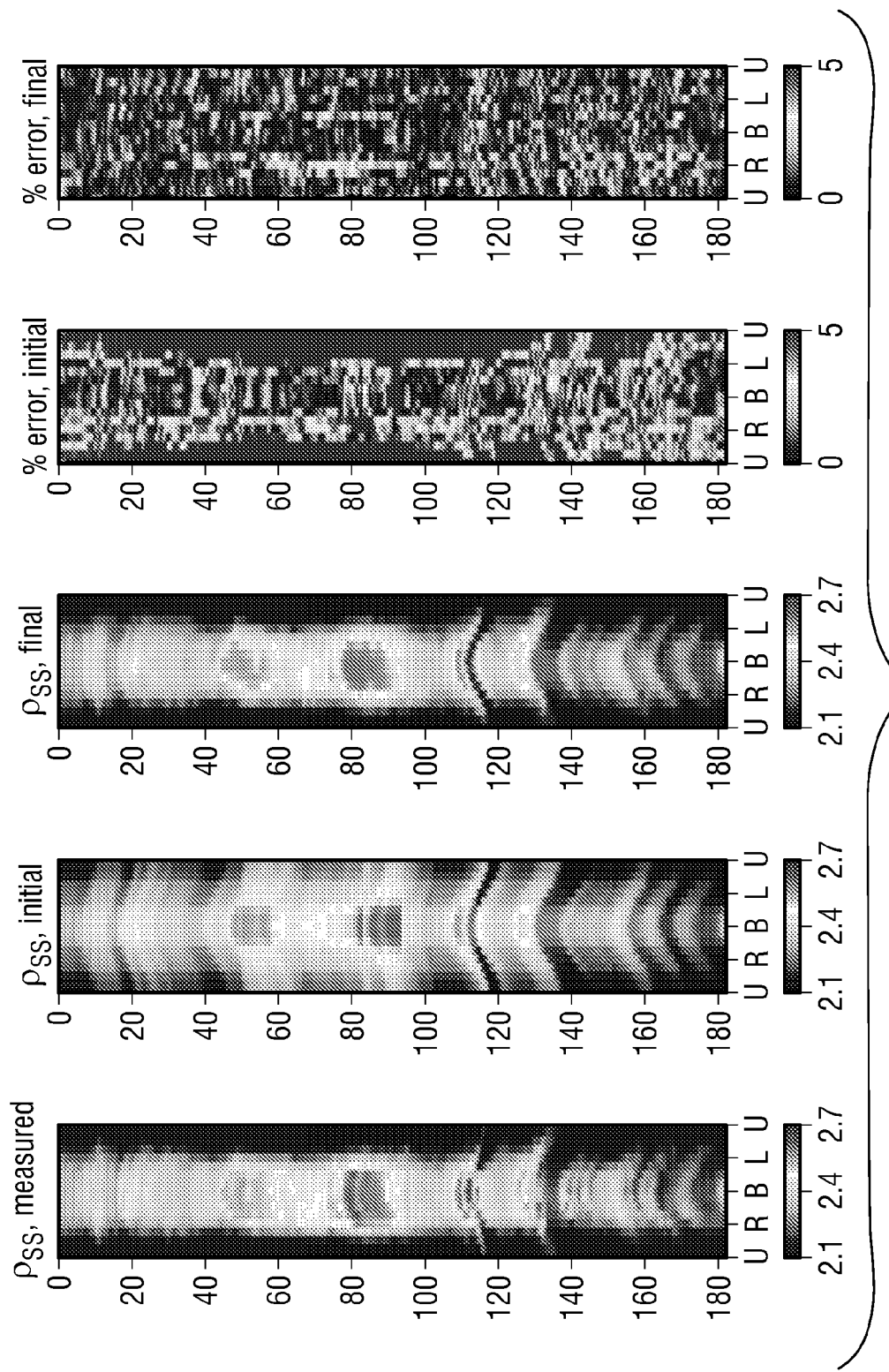

FIG. 28 is a composite figure of reconstruction of SS images for high-angle well inversion of interval from North Sea field data-set.

Figure 29:
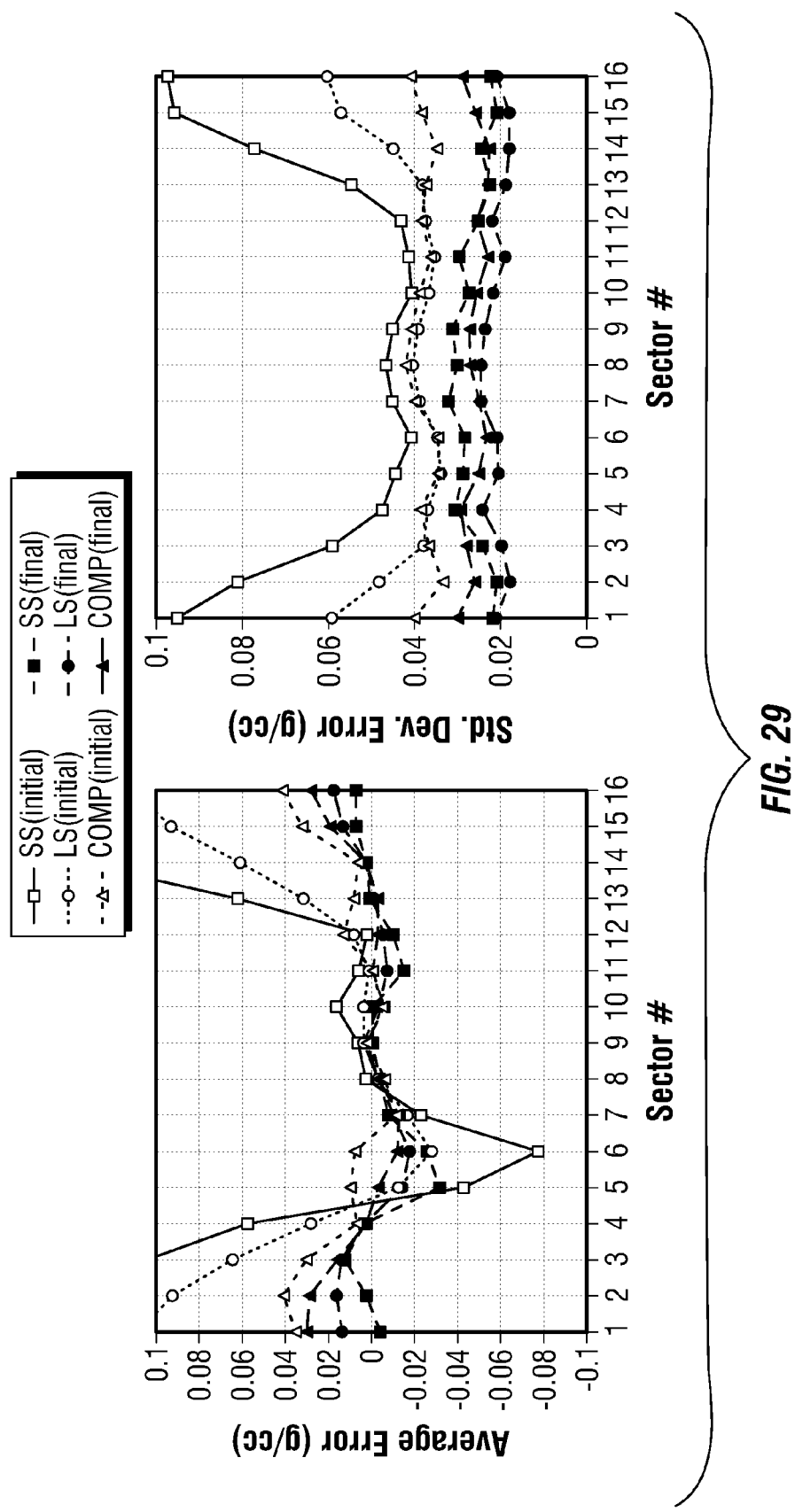

FIG. 29 is a comparison plot of high-angle inversion of an interval from the North Sea field data-set: Average error per sector for each channel (left) Standard deviation of error per sector for each channel (right).

Figure 30:
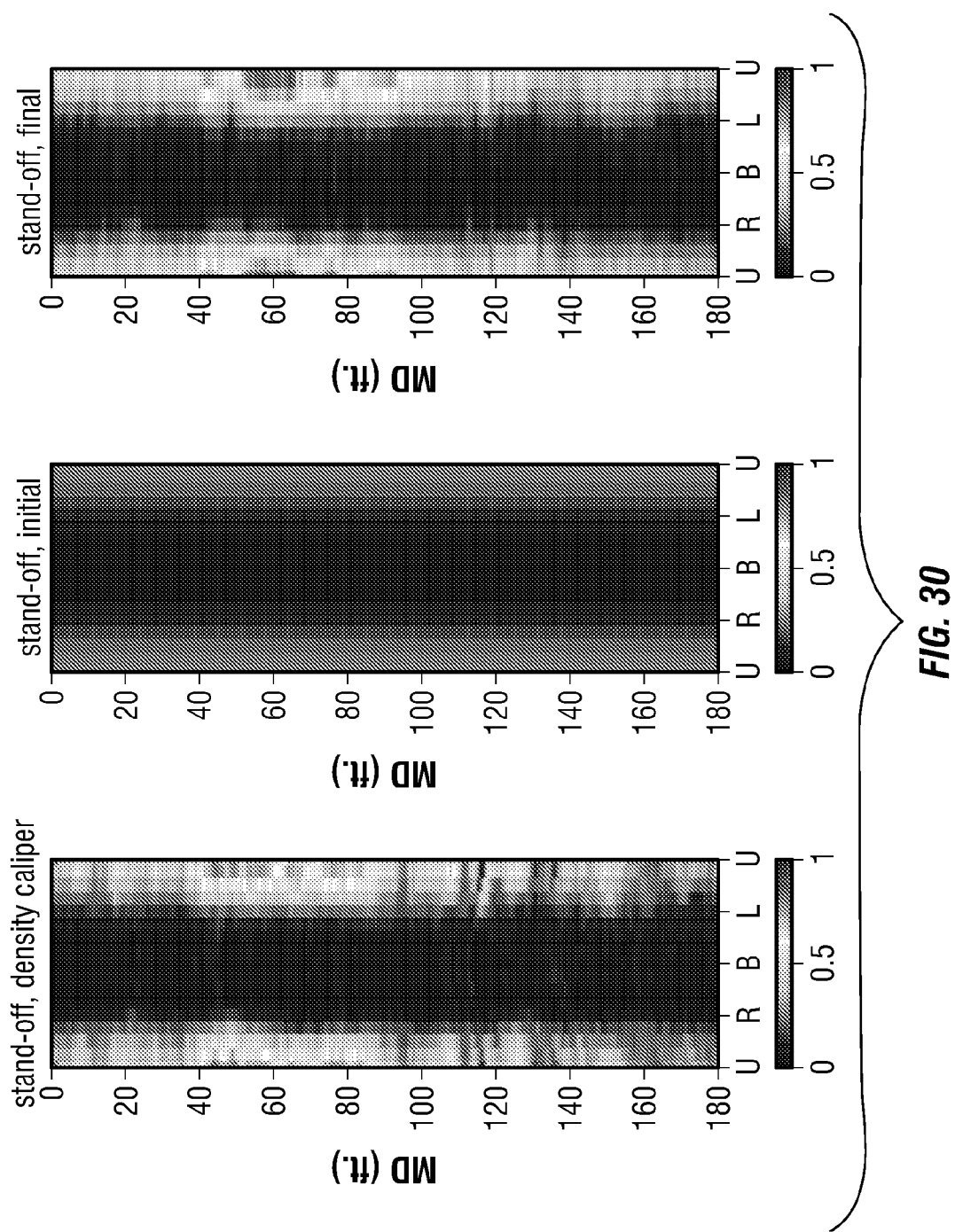

FIG. 30 is a comparison plot of borehole geometry for high-angle well inversion of an interval from North Sea field data-set: density-caliper (left); initial geometry (middle), and inversion-based caliper (right) in inches.

Figure 31:
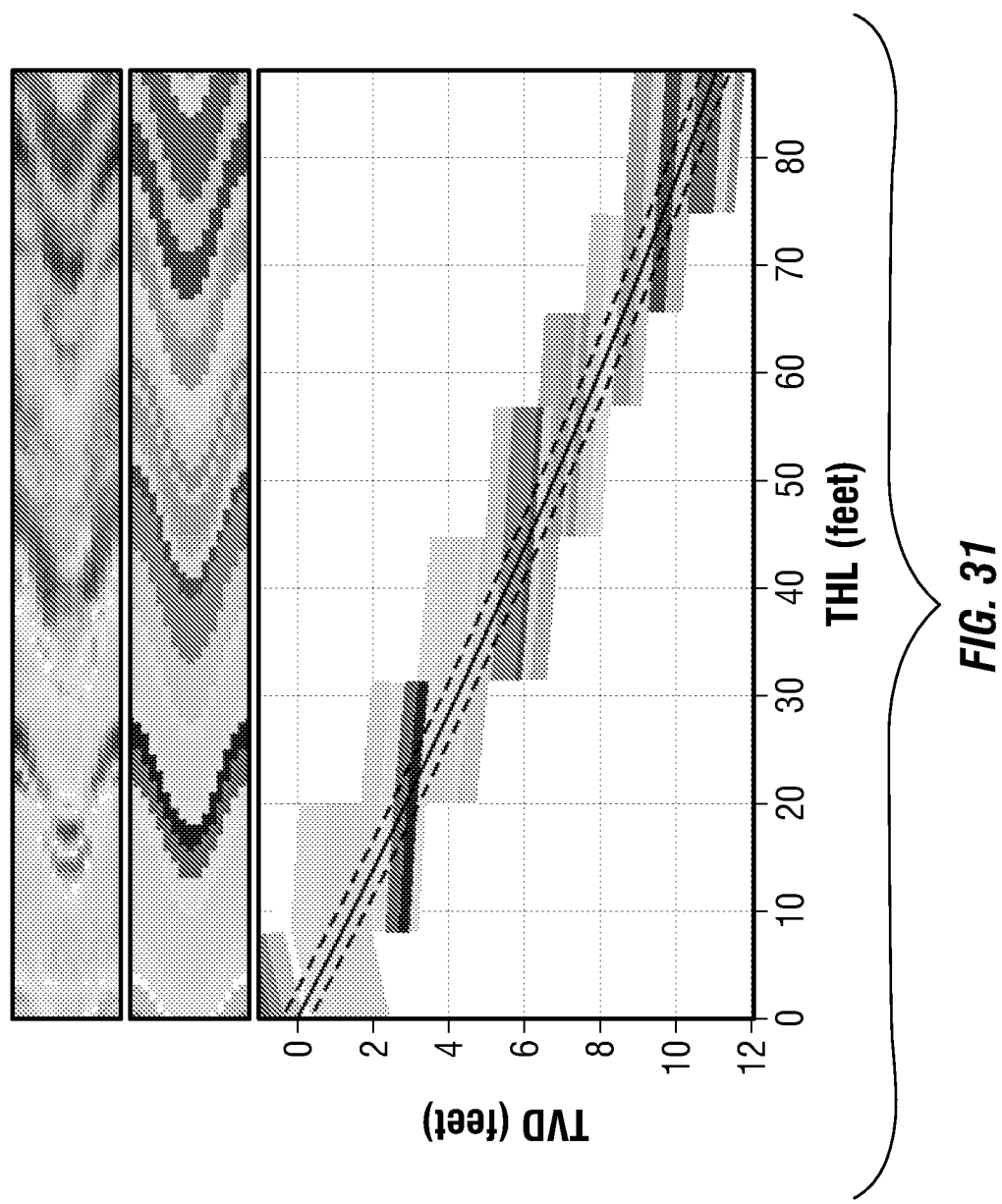

FIG. 31 is a composite figure of a high-angle inversion workflow on North Sea field data set: Measured COMP image (top), final borehole-corrected image (middle), and final formation model in curtain-section plane (bottom). The black curves represent trajectory and the borehole surfaces.

Figure 32:
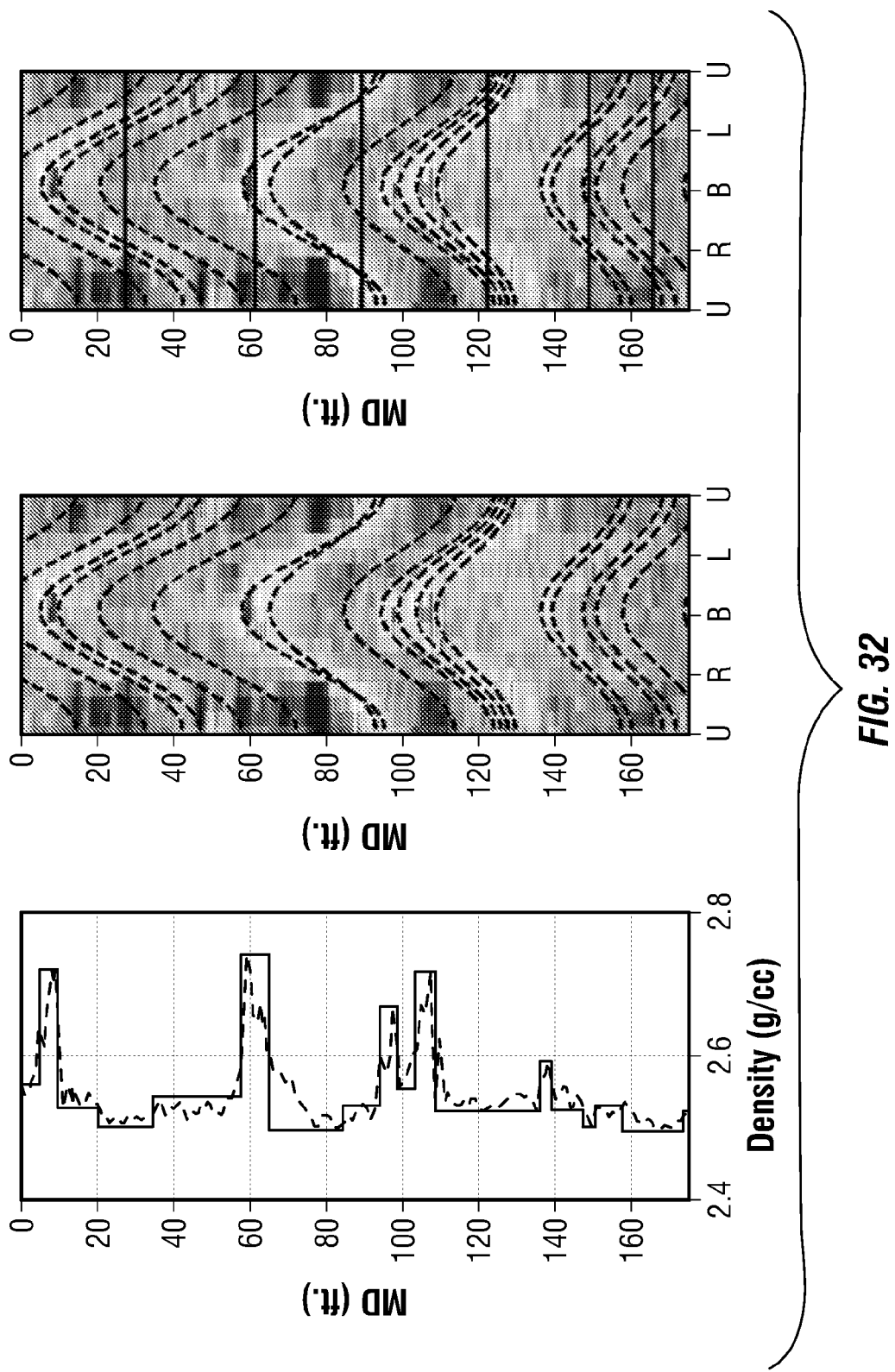

FIG. 32 is composite figure for high-angle well pre-processing for gas shale field data-set: bottom quadrant COMP squaring (red curve) produced a density profile (blue) (left); Sinusoid extraction from COMP image (dashed black curves) (middle); Adaptive segmentation (solid black lines) (right).

Figure 33:
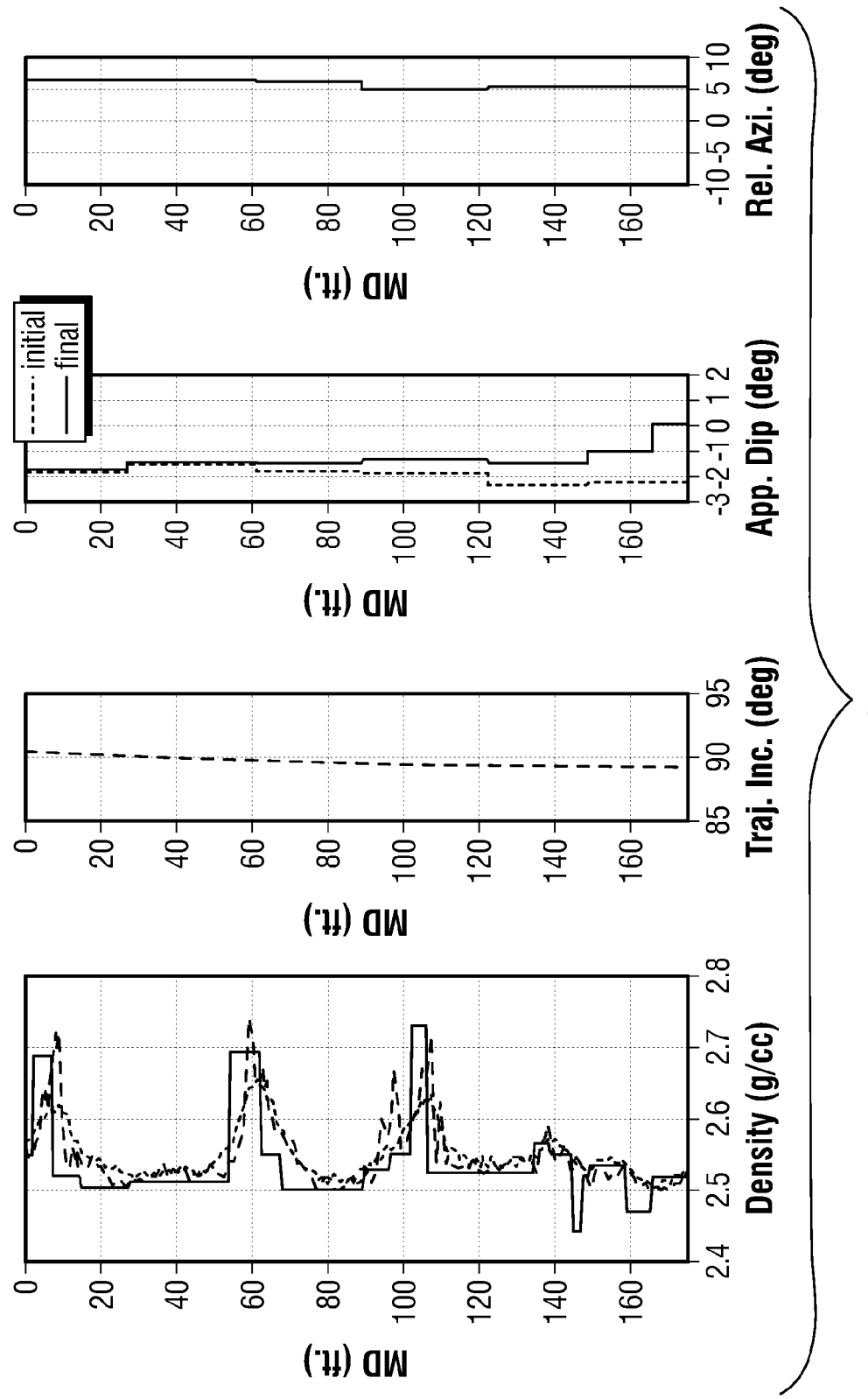

FIG. 33 is a composite of a high-angle inversion of gas shale field data-set. Inverted density profile (blue), bottom quadrant COMP: measurements (red) reconstructed (green); Trajectory inclination, initial and final apparent dip, and relative azimuth (right).

Figure 34:
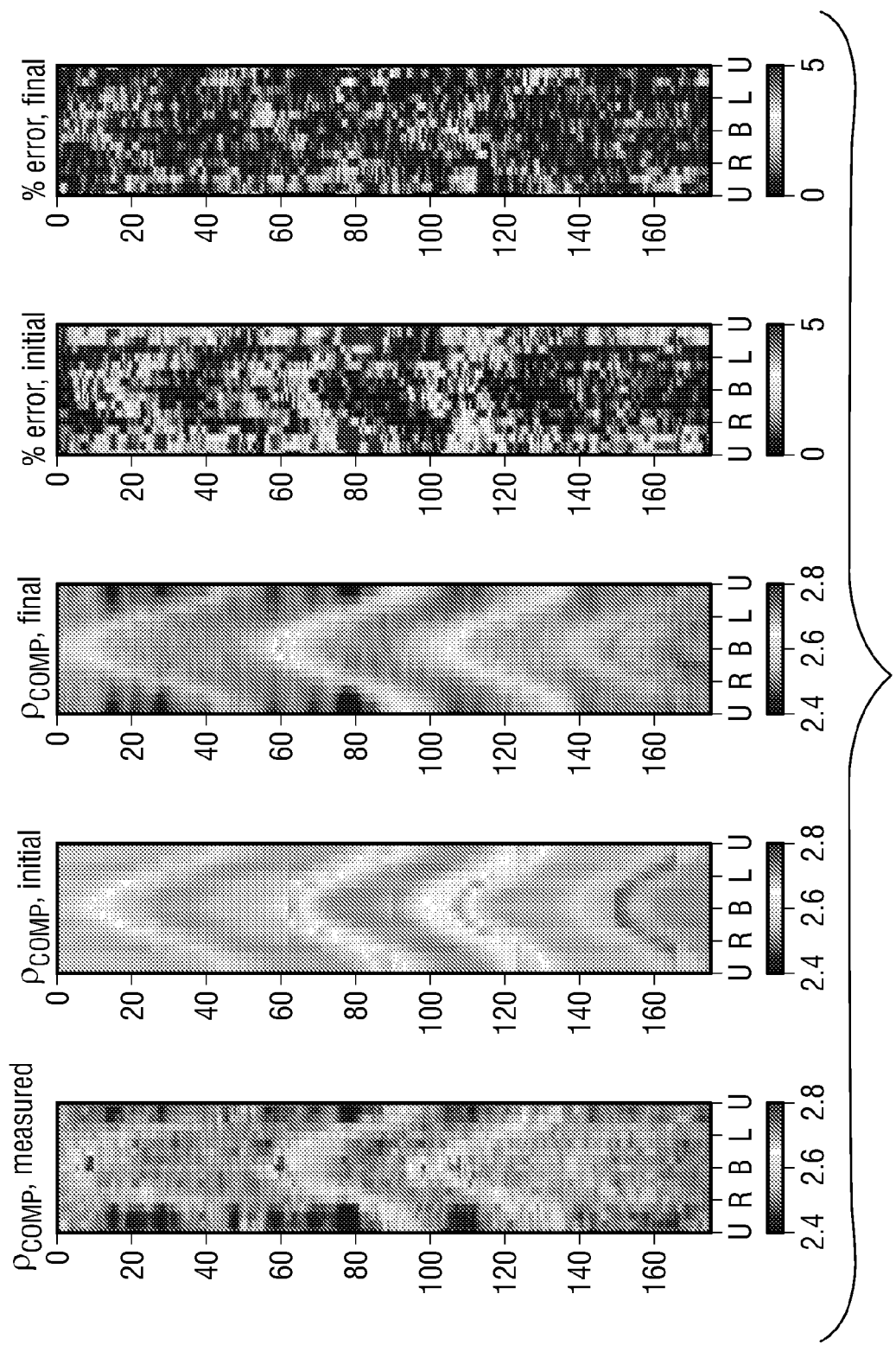

FIG. 34 is a composite of a reconstruction of COMP image for high-angle well inversion of interval from a gas shale field data-set.

Figure 35:
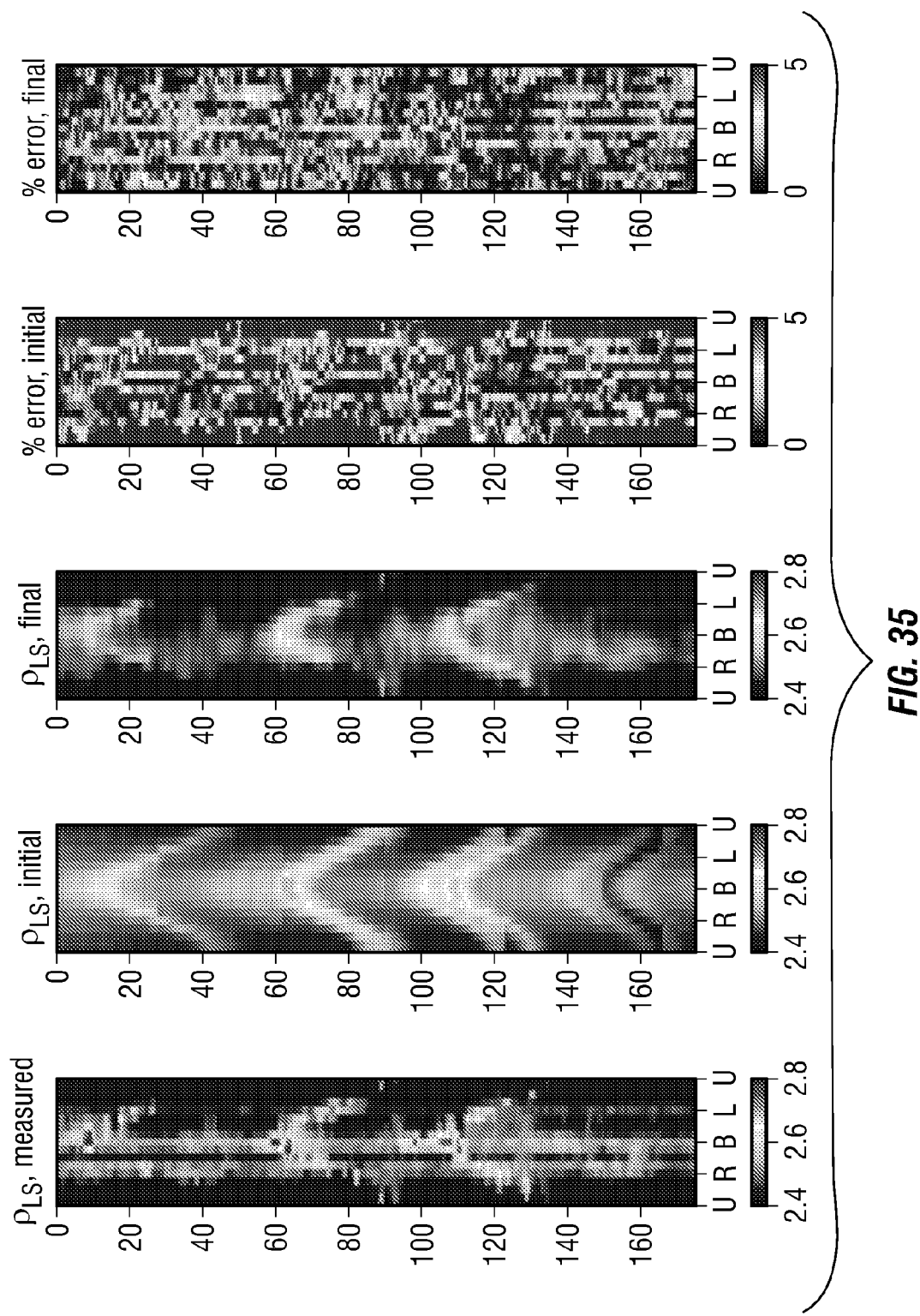

FIG. 35 is composite of a reconstruction of LS images for high-angle well inversion of interval from a gas shale field data-set.

Figure 36:
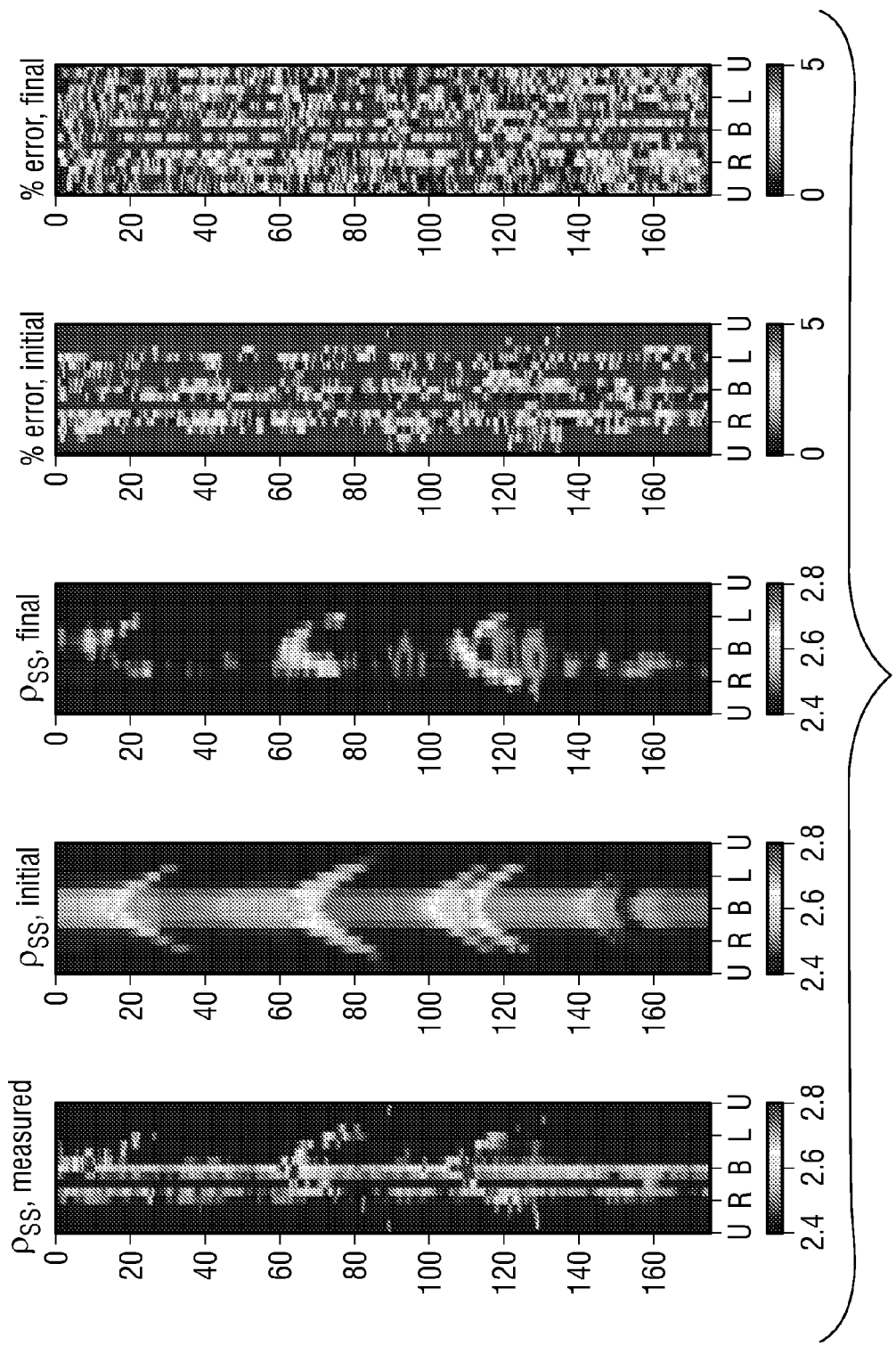

FIG. 36 is a composite of a reconstruction of SS images for high-angle well inversion of interval from a gas field data-set.

Figure 37:
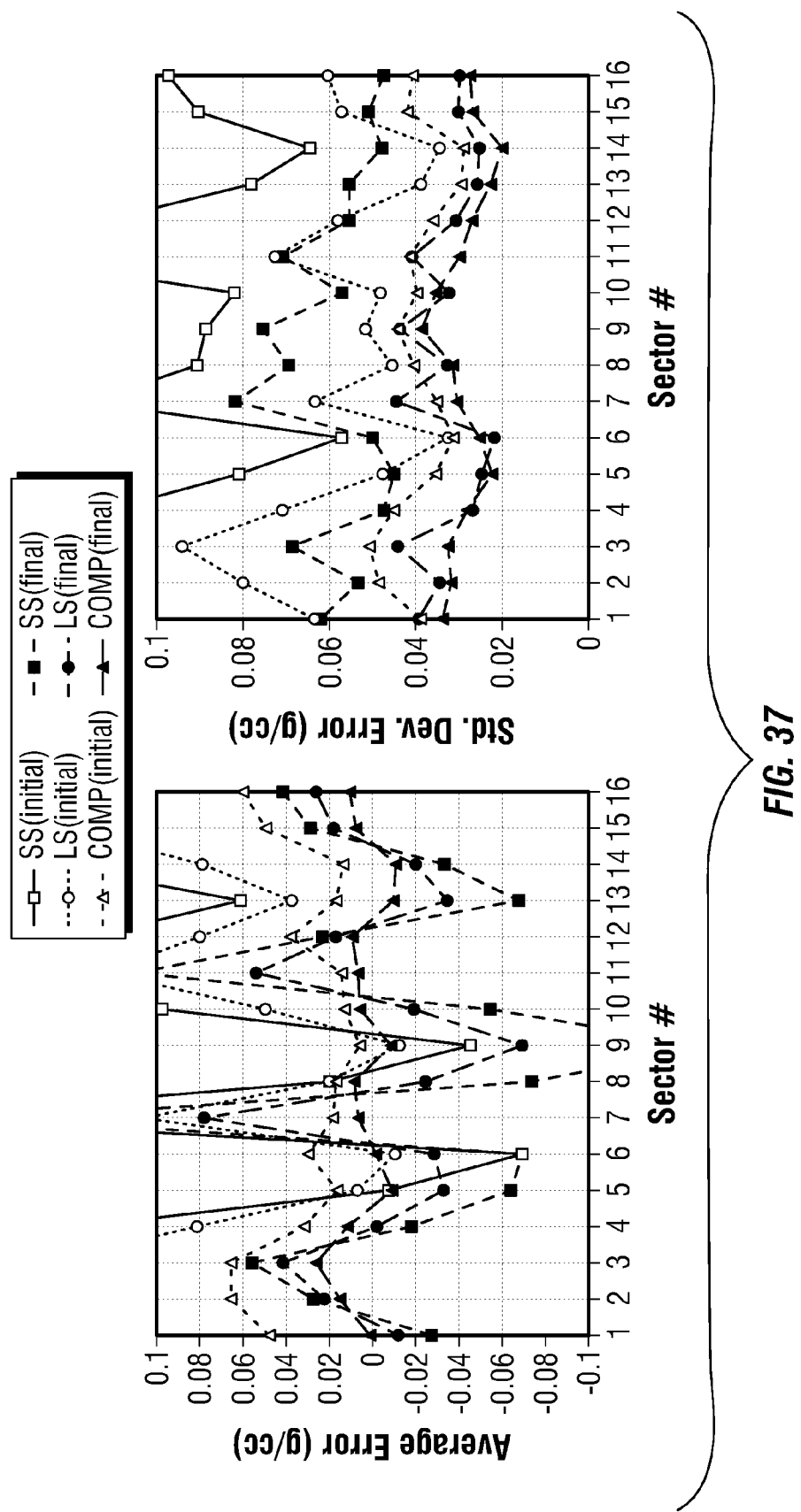

FIG. 37 is plot of a HA inversion of an interval from a gas shale field data-set: Average error per sector for each channel (left) Standard deviation of error per sector for each channel (right).

Figure 38:
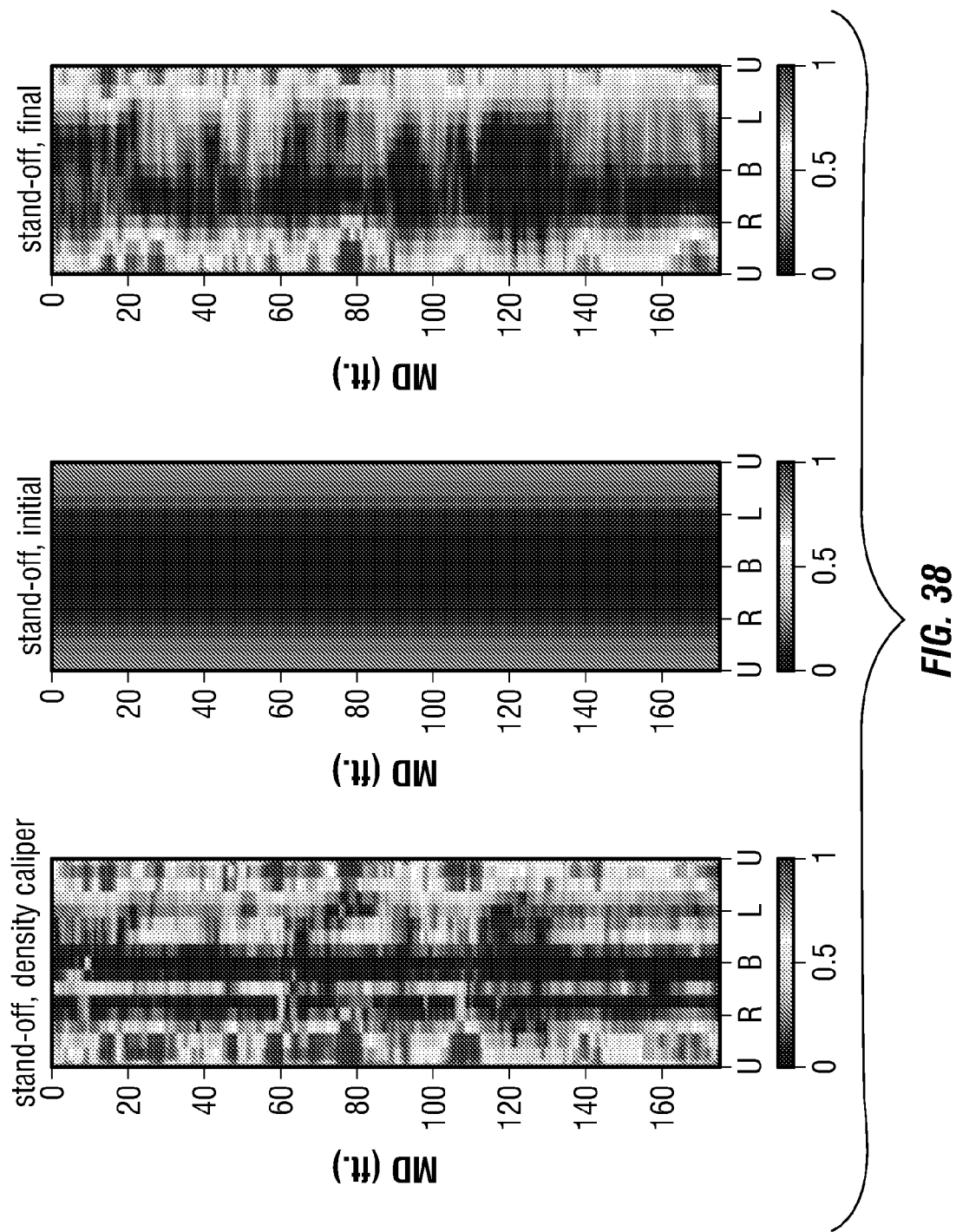

FIG. 38 is a comparison of borehole geometry for high-angle well inversion of an interval from a gas shale field data-set: density-caliper (left); initial geometry (middle), and inversion-based caliper (right) in inches.

Figure 39:
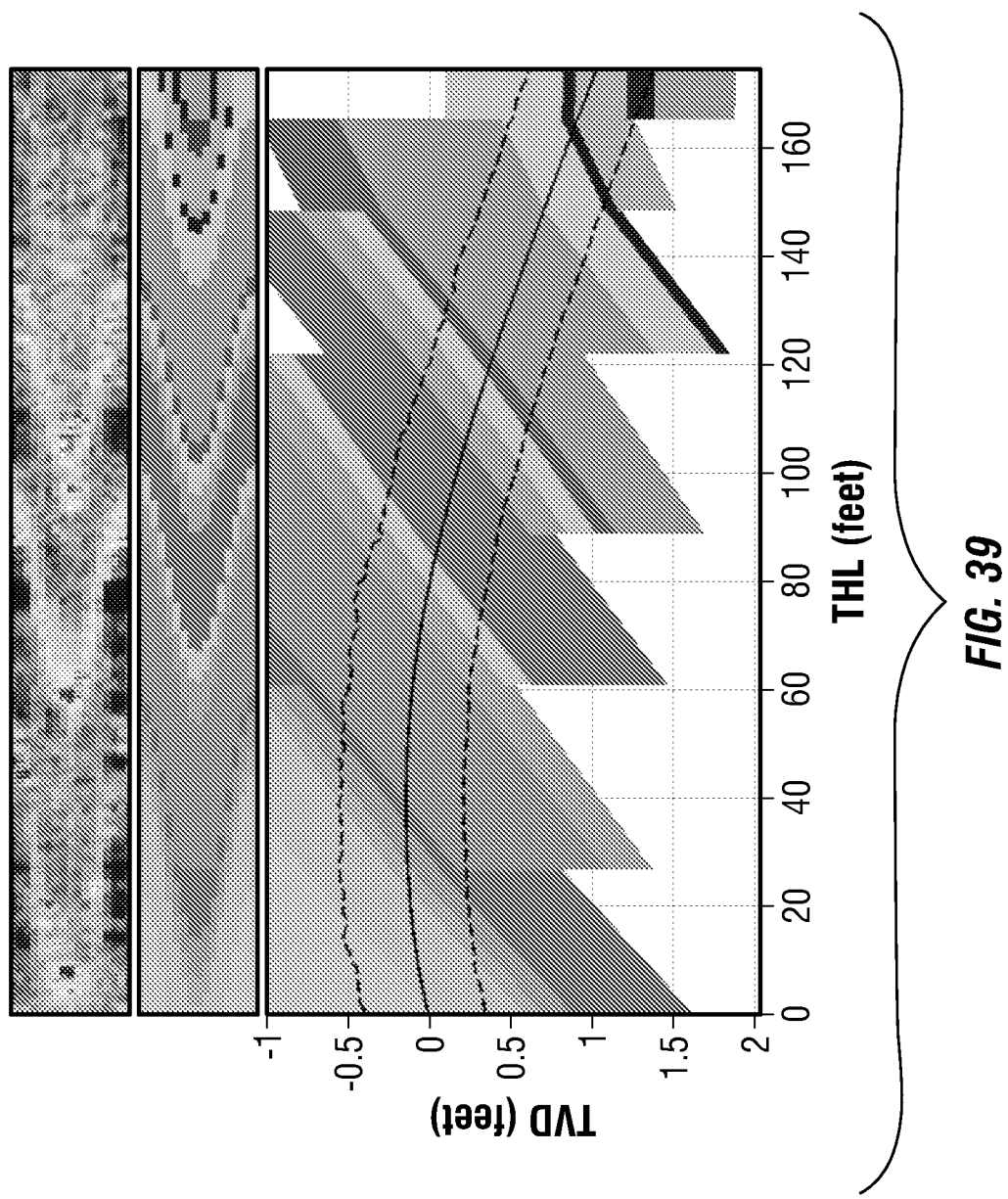

FIG. 39 is a composite figure of a HA inversion workflow on gas shale field data set: measured COMP image (top), final borehole-corrected image (middle) and final formation model in curtain-section plane (bottom). The black solid curve is the tool trajectory and the dashed black curves are the borehole surfaces in the curtain-section plane.

Figure 40:
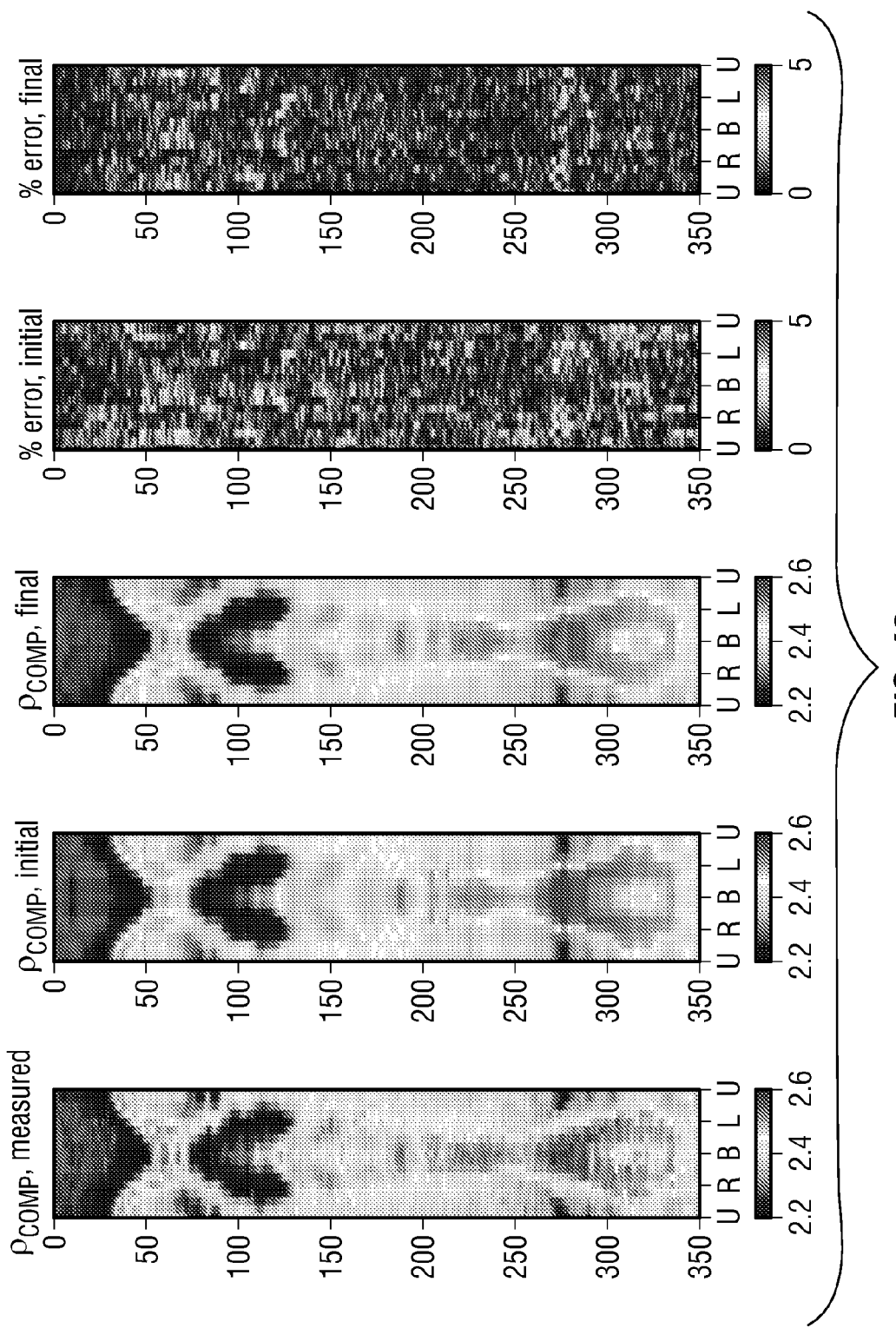

FIG. 40 is a composite figure for reconstruction of COMP image for horizontal well inversion of interval from North Sea field data-set.

Figure 41:
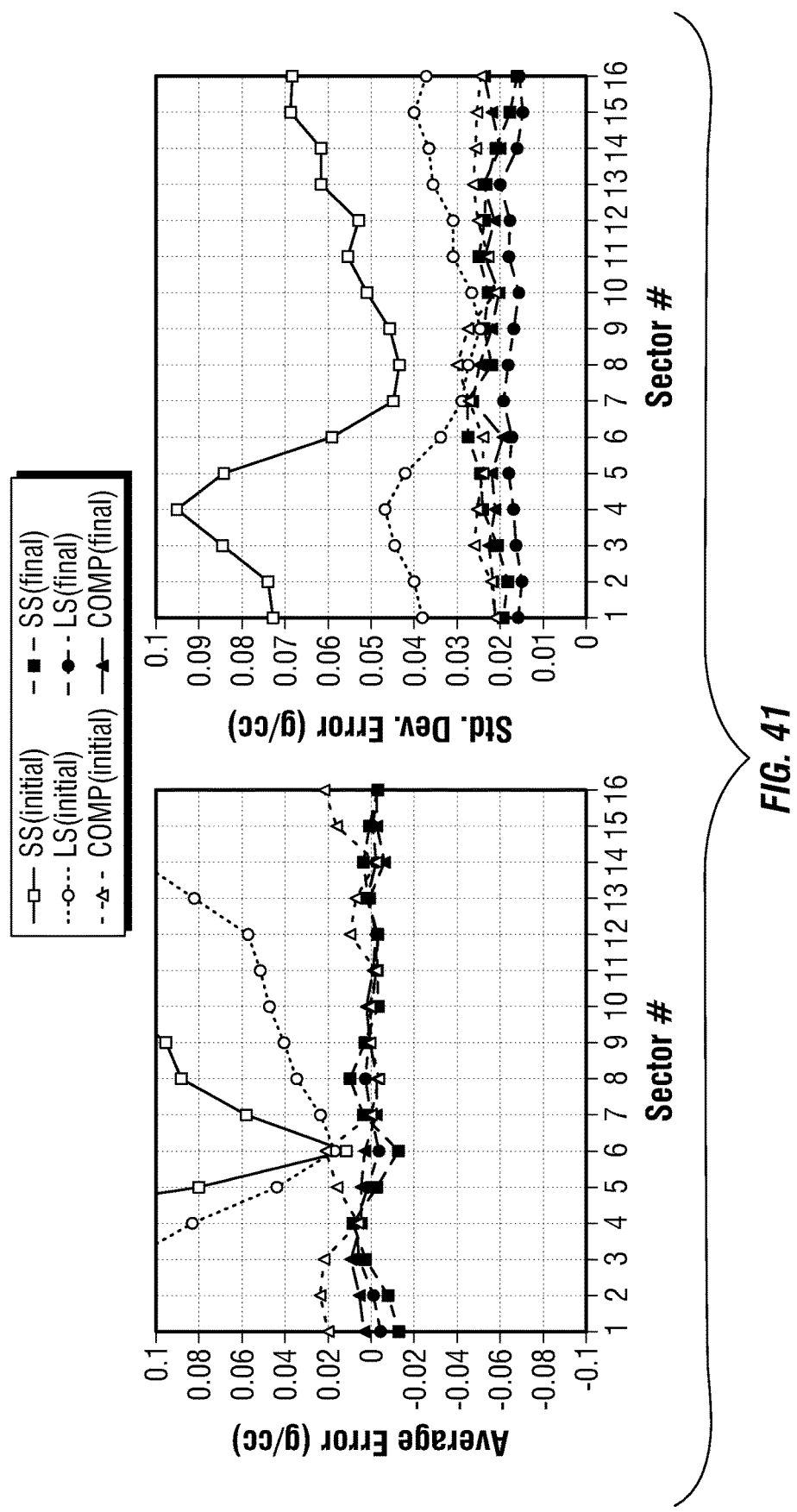

FIG. 41 is a plot of horizontal well inversion of an interval from North Sea field data-set: Average error per sector for each channel (left) Standard deviation of error per sector for each channel (right).

Figure 42:
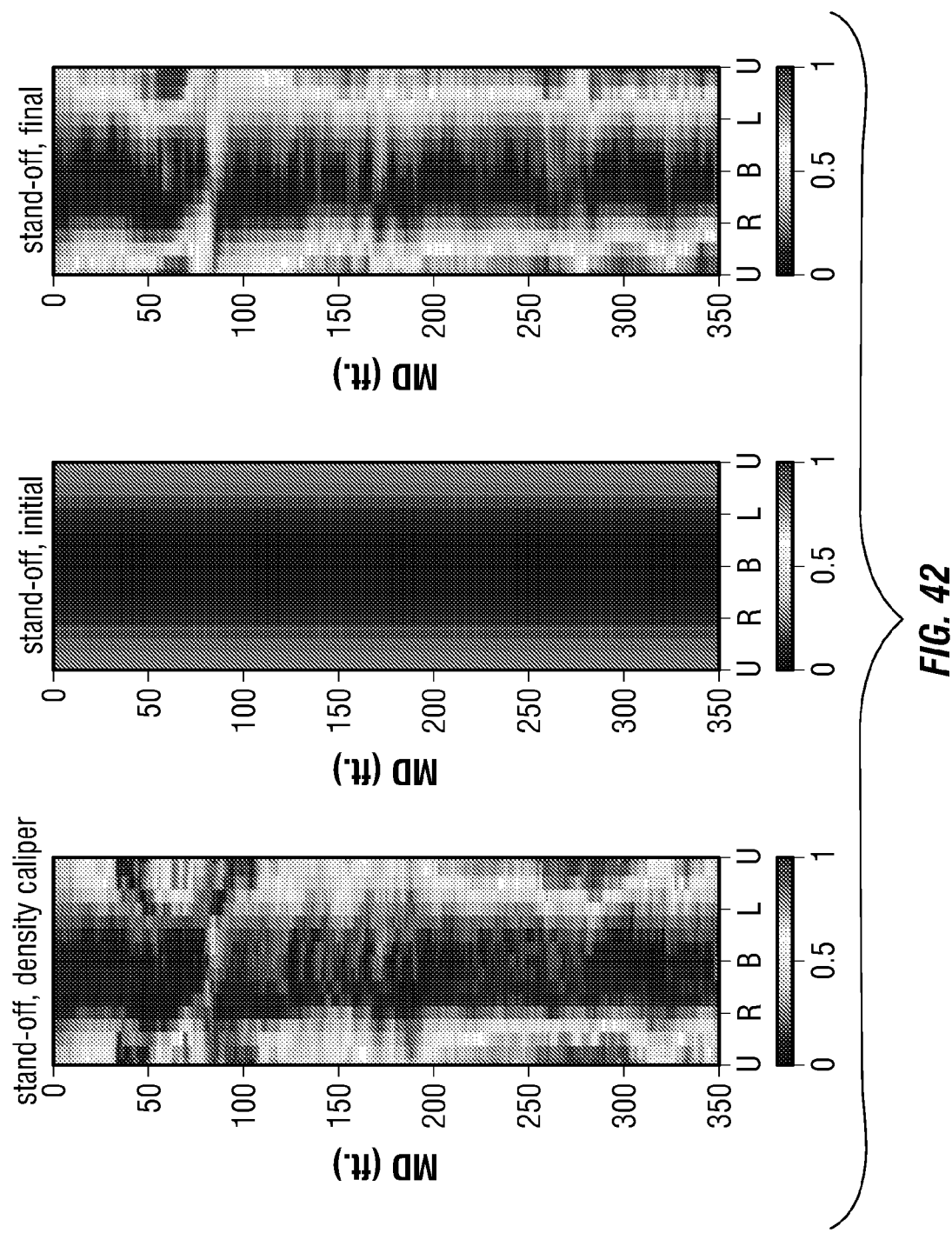

FIG. 42 is a comparison of borehole geometry for horizontal well inversion of an interval from North Sea field data-set: density-caliper (left); initial geometry (middle), and inversion-based caliper (right) in inches.

Figure 43:
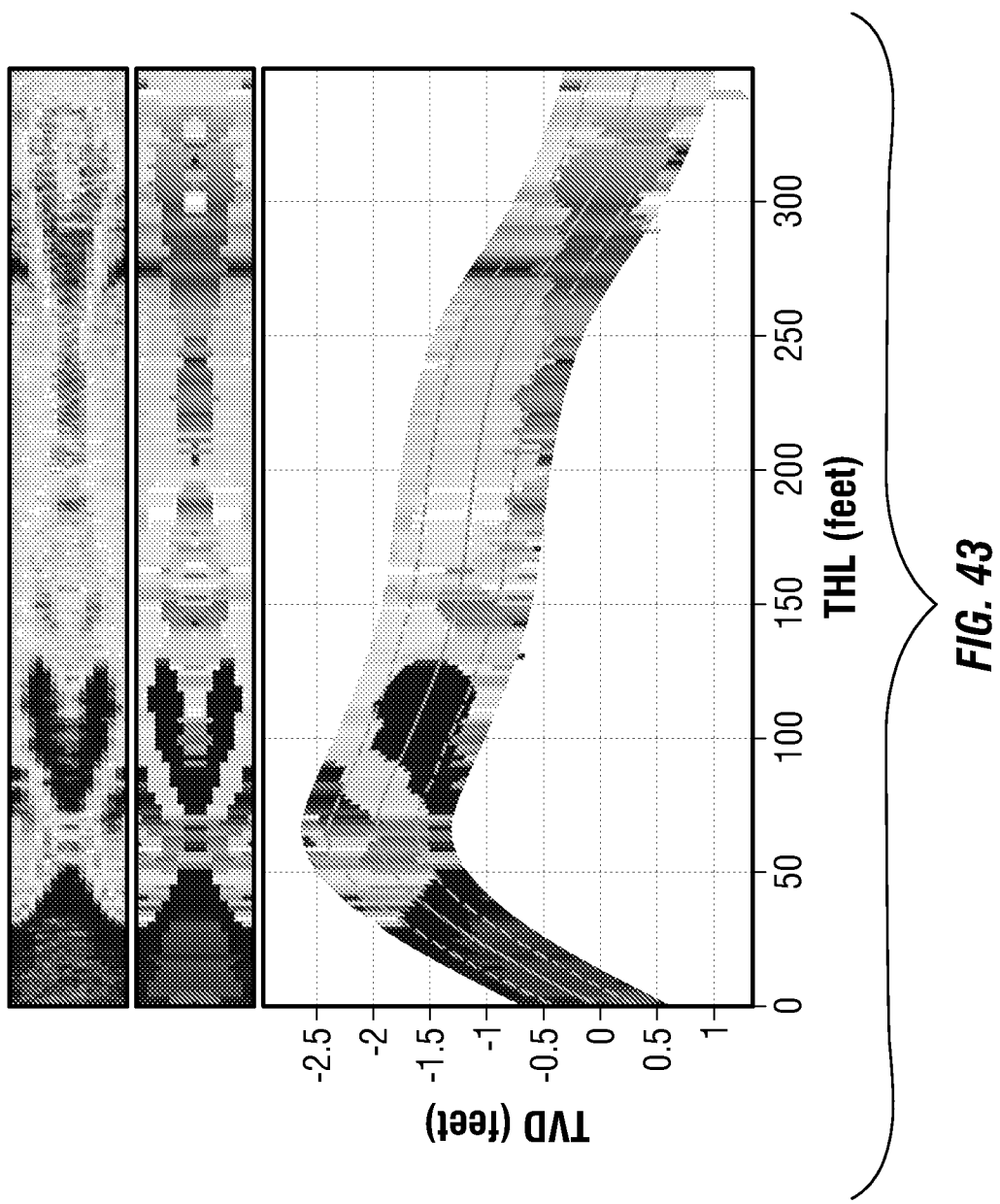

FIG. 43 is a composite plot of a final formation model in curtain-section plane reconstructed by HZ well workflow (bottom), corresponding measured COMP image and borehole-corrected image (middle).

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The statements made herein merely provide information related to the present disclosure and may not constitute prior art, and may describe some embodiments illustrating the invention.

In this application, we present a model-based inversion incorporating the new second-order 3D sensitivity functions. This inversion is capable of processing density images in HA as well as HZ wells, solving for a 1D layered formation model, formation dip and azimuth, and 3D borehole geometry with locally homogeneous mud properties. Lateral variations in the model parameters are captured using an adaptive trajectory segmentation based on relative dip. The inversion-based workflows are driven by measurement sensitivities, ensuring that the interpretation is fully consistent with the measurements from all sectors and channels.

The algorithm is primarily intended for 3D petrophysical interpretation in high-angle and horizontal wells, and for real-time well placement. The methodology and model parameterization are fairly general and are compatible with models used for interpretation of other measurements (such as resistivity and directional EM) in HA, HZ wells.

A fast-forward model for the gamma-gamma density tool response was developed based on second-order 2D (axisymmetric) sensitivity functions. Here, the original 2D sensitivity functions have been expanded into a full 3D model of spatial sensitivity. The simulation time is reduced from hours using MCNP to milliseconds for the sensitivity approach, making it applicable for commercial petrophysics. Due to use of second-order 3D sensitivity functions, the accuracy of fast-forward model is comparable to measurement accuracy in wide range of high-angle and horizontal well scenarios, enabling use in rigorous physics-based inversion workflows to reduce ambiguity and minimize subjectivity in the interpretation process. The inversion-based approach promises to represent a step change in quantitative interpretation of nuclear measurements in HA/HZ wells, producing more accurate density profile, formation dip and azimuth, with accurate boundary positions and layer densities free of boundary and borehole effects, resulting in improved porosity and reserves estimates.

Workflows are developed for the interpretation of logging-while-drilling density images in high-angle and horizontal wells. The key component of the workflow is the 3D parametric inversion using a robust Gauss-Newton optimization engine and a new fast-forward model based on second-order 3D sensitivity functions.

The parametric model used for interpretation includes a multi-layer dipping formation, mud properties, arbitrary borehole geometry, and 3D well trajectory. Lateral variations in formation and borehole parameters are captured by defining the models in discrete trajectory segments using an adaptive segmentation based on the local relative dip. Measurement sensitivities are used to design the flexible and robust inversion-based workflow for determining optimum parameter values from all the available measurements. A sliding window is used to enforce consistency of models between adjacent segments. The result of the inversion is the accurate layer thicknesses, shoulder-bed corrected layer densities, formation dip and azimuth in each segment. The inversion also produces a borehole-corrected formation density image and a robust caliper that takes into account the layered formation as background. The algorithm is primarily intended for 3D petrophysical interpretation in high-angle and horizontal wells. The methodology and model parameterization is general and compatible with models used for interpretation of other measurements (such as resistivity and directional EM), making feasible future integration in joint multi-physics interpretation.

The workflow is tuned for scenarios with wellbore trajectory nearly parallel to layer boundaries, where ambiguity in interpretation is increased due to difficulty in determining dip, lateral changes in layer properties and influence of stand-off and nearby non-crossed boundaries.

The methodology is validated on synthetic thin layer models with variable dip and azimuth. Several examples are presented showing successful application of workflow to field data. The inversion-derived caliper is compared to the conventional density caliper to illustrate the improvement.

We include in the analysis layered formation models simultaneously with the 3D borehole geometry to better capture variable standoff and properties of thin layers, essential for improved quantitative interpretation especially in horizontal wells. Variations in formation parameters along the trajectory in high angle wells (with relative dip up to 88°) were captured by defining the 1D formation models in discrete trajectory segments using an adaptive segmentation algorithm based on image sinusoids so as to improve inversion robustness in each segment.

The horizontal well workflow (for relative dip)88°-92° takes into account non-crossed layers and enables building the 2D curtain section model as superposition of 1D formation models defined in very short segments along the trajectory, with layer boundaries in each segment oriented parallel to the trajectory. For both high-angle and horizontal well workflows, the inversion uses a sliding window scheme to enforce model consistency between adjacent segments.

Inversion-based approach for estimating the borehole geometry based on two model parameterizations removes sinusoidal artifacts in conventional density caliper results, which are due to coupling of boundary and borehole effects. The inversion-based caliper is more robust because it uses all the information available, and is more accurate because it models the true geometry as well as the layered background, effectively decoupling the borehole effect from boundary effect.

Inversion results have been validated using noisy synthetic data and have been successfully applied to several field data sets. Results for field data-sets show good consistency of the final formation model from one segment to the next. Measurement reconstruction for all channels is very good and the final reconstruction errors are typically comparable to the measurement accuracy.

Nuclear Density Measurements

The ECOSCOPE LWD™ tool integrates a full suite of formation evaluation measurements surpassing the classic "triple-combo" service, with many of the measurements co-located and closer to the bit compared with the previous generation. In addition to propagation resistivities, the tool has two density measurements: a gamma-gamma density from a conventional chemical source and a neutron-gamma density derived from the pulsed neutron generator (PNG). The PNG also enables the spectroscopy, neutron, and sigma measurements.

Nuclear gamma-gamma density measurements are one of the key formation evaluation measurements and are used to infer formation porosity from the knowledge of lithology and pore fluids. The gamma-gamma measurement uses a gamma-ray source and two gamma-ray detectors generating three independent measurements: a long-spacing (LS) and short-spacing (SS) apparent electron density and the apparent volumetric photoelectric factor (UAPP), used to infer the lithology. The density measurement is resolved into 16 azimuthal sectors each spanning 22.5°. The radial sensitivity extends radially approximately 6 inches into the formation, while the axial sensitivity covers 14-18 inches. Therefore, in HAHZ wells, the effective true vertical resolution will vary between these two factors depending on the relative angle between the trajectory and the formation layers.

The LS and SS based electron densities are combined in a "spine-and-ribs" algorithm to compute the compensated (COMP) density for each sector, quadrant and 16-sector average. The compensation is also used along with the apparent mud density to compute a standoff distance which is added to the stabilizer size to create a 3D caliper, henceforth referred to as the density caliper. The differential (DRHO) density, defined as the difference between COMP and LS densities, is used as a quality indicator for the COMP measurement.

The images are used to identify bed boundaries and estimate dip, enabling optimal well placement, steering the well to more productive zones. Normally the bottom quadrant density is used for petrophysical interpretations. However, in HAHZ wells their use is not straightforward since they often need to be combined with non-azimuthal gamma-ray and resistivity measurements, which, unlike the bottom quadrant density response, are also affected by layers to the side and above the borehole. Although shallow, the density response can be affected when approaching bed boundaries.

Fast Forward Modeling of Nuclear Density

Figure 1:
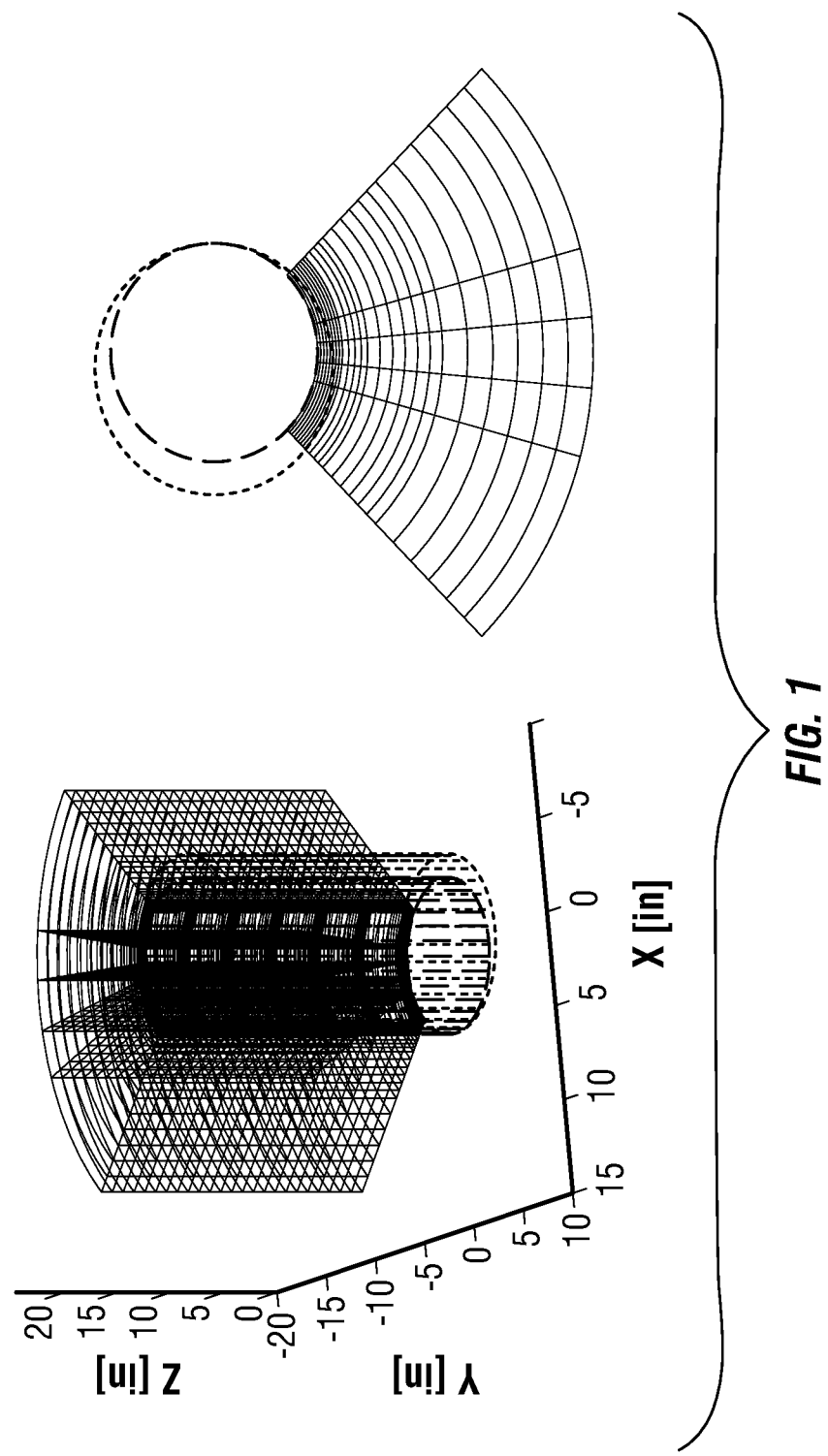
FIG. 1 is a computational grid for fast-forward modeling: 3D grid (left) and r-θ grid (right), tied to the sensor, extending from −45° to 45°.
Figure 2:
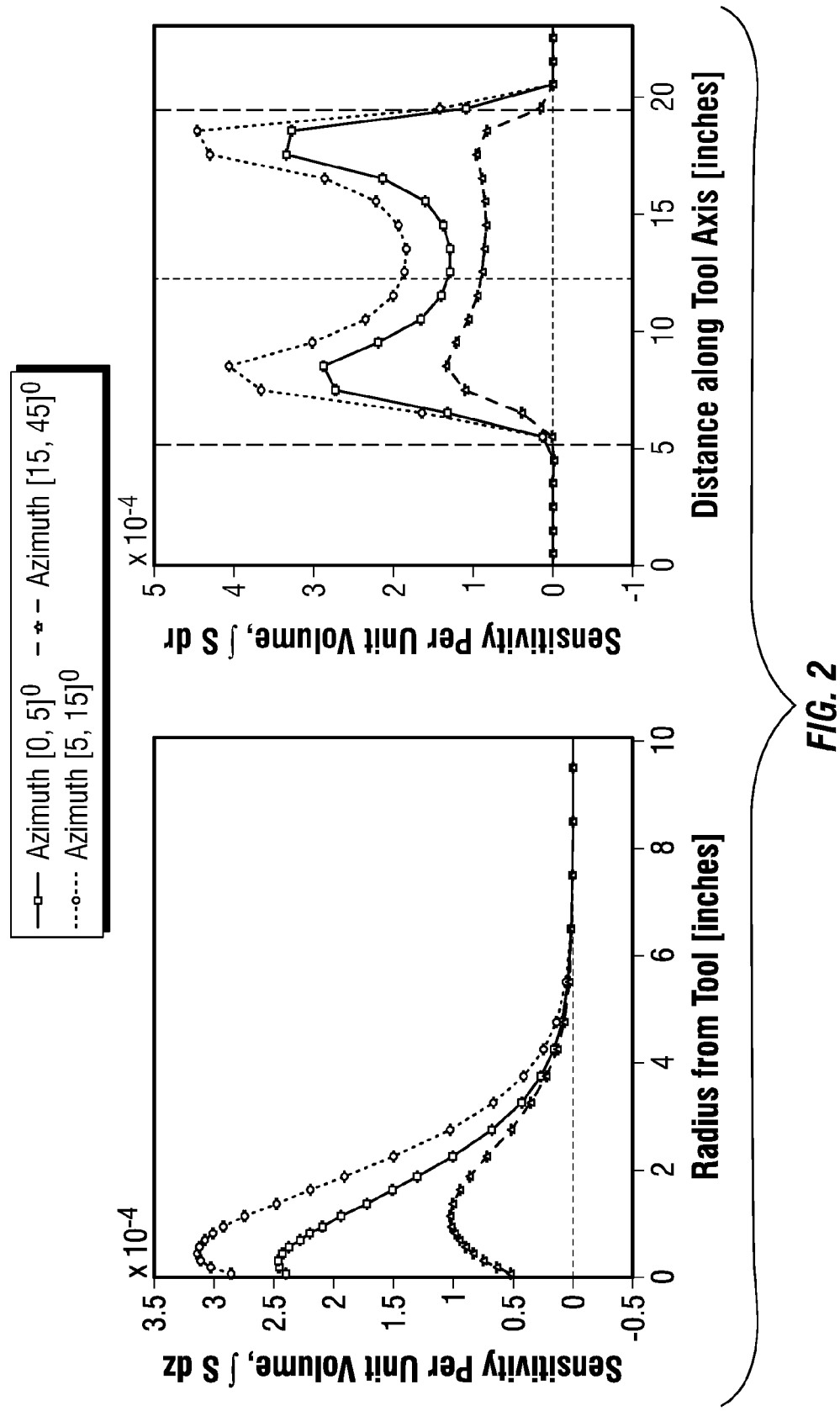
FIG. 2 is a plot of LS nuclear density integrated sensitivity functions azimuthal dependence: radial (left) and axial (right).
Figure 3:
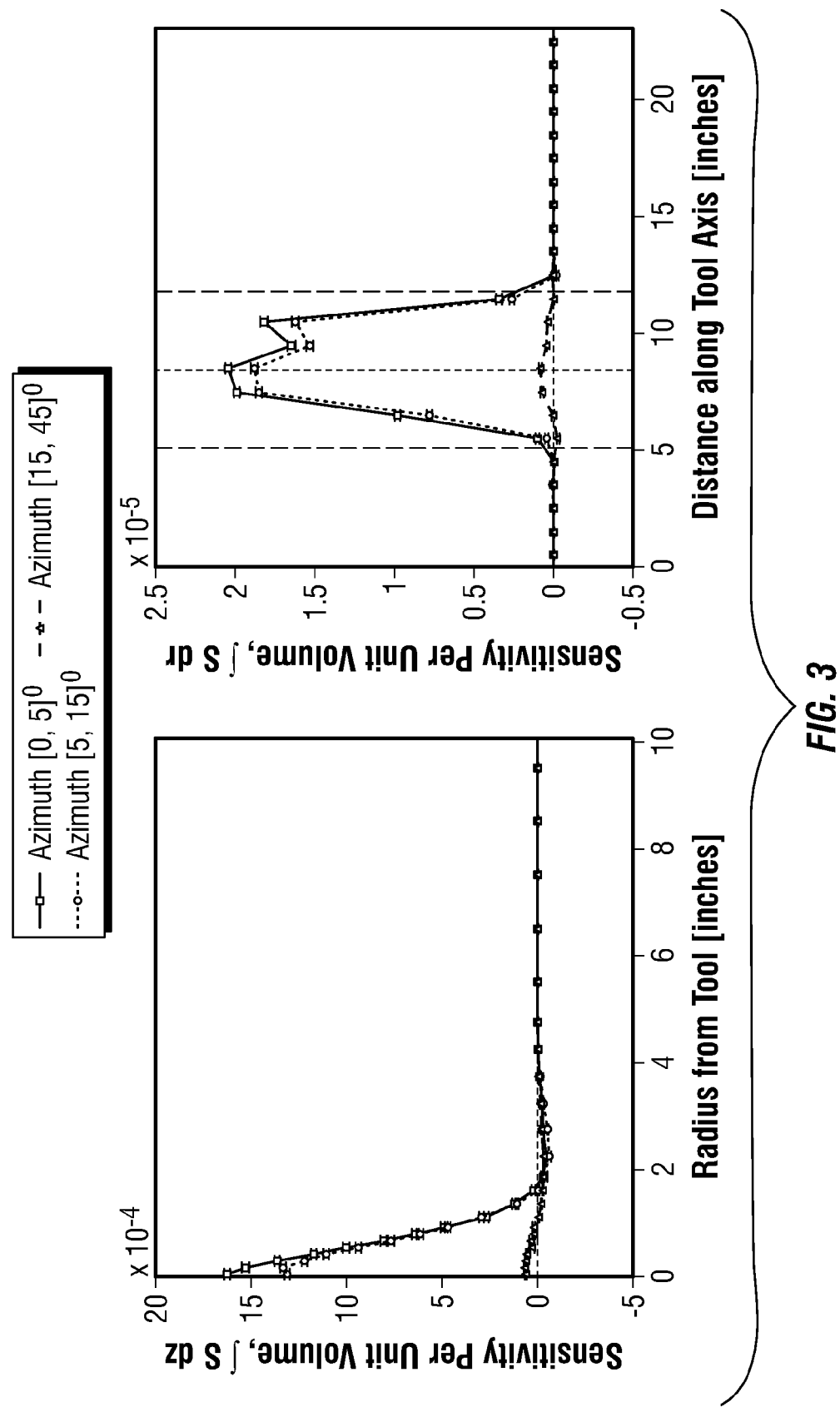
FIG. 3 is a plot of SS nuclear density integrated sensitivity functions azimuthal dependence: radial (left) and axial (right).

The fast-forward model uses precomputed first and second order sensitivity functions defined for the 3D grid shown in FIG. 1 to compute measurement responses for density and photoelectric factor properties defined on the same grid. There are 5 cells in the azimuthal direction, with grid nodes located at ±5°, ±15° and ±45° with respect to the detector face normal. The radial grid extends out to 9 inches from the tool, with the cell size gradually increasing from 1/8 inch to 1 inch, total 22 cells. The uniform grid in axial direction has 19 cells. The spatial variation of integrated radial and axial sensitivity for LS and SS is shown in FIGS. 2 and 3, respectively. Including the full 3D sensitivity is especially important for the LS channel.

The forward modeling is about million times faster than MCNP simulation used to generate them. It takes milliseconds to compute the responses for a single log-point and sector. The model has representative accuracies of 0.02 g/cc, 0.05 g/cc, and 0.03 g/cc for LS, SS, and COMP, respectively. The representative accuracy of the UAPP model is 1 b/cc for non-barite muds, while for heavy barite muds, the model is only qualitative. In configurations with stand-off up to 0.25 in, the accuracy of the model for all channels is comparable to the measurement accuracy, better than 0.02 g/cc. The error in approximation of COMP remains the same for standoffs up to 1 inch, while it nearly doubles for LS over the same range. The SS accuracy decrease by a factor of two for an intermediate standoff of 0.5 in.

Model Parameterization

The parametric model includes separate components for describing the formation and borehole along a given wellbore. Complete and general model parameterization enables easy modeling, sensitivity analysis and interfacing to the inversion. In general, model parameterization should not be related to measurements, and is shared for interpretation of different measurements to build a common model.

We consider separately the high angle well scenario from the horizontal well scenario. In the first, the tool crosses multiple boundaries, while in the latter the tool is nearly parallel to formation boundaries and may include non-crossed boundaries. The models are compatible and could be easily merged. In both scenarios the borehole models are the same, defined in discrete trajectory segments. To decide which scenario best applies to a set of data, the COMP image is used to form a parametric model for sinusoidal features.

Methodology for Automatic Dip Estimation

Figure 5:
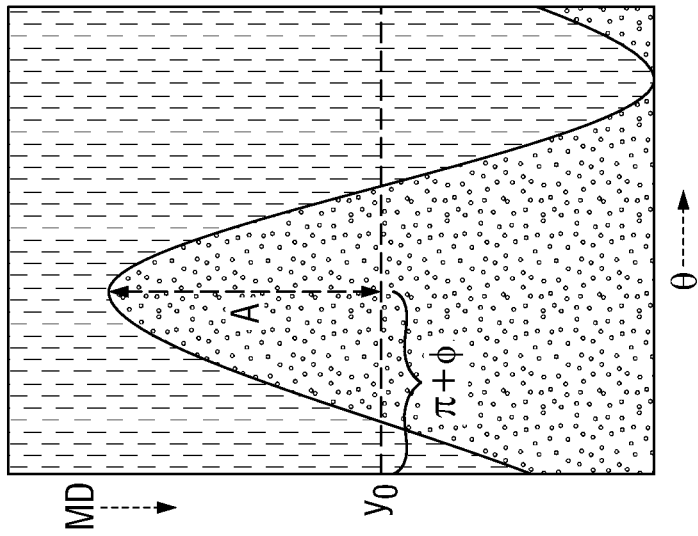
FIG. 5 is a COMP image corresponding to logging scenario shown in FIG. 4, for an idealized tool with infinitesimal volume-of-investigation and negligible borehole effects. Sensor azimuth θ is referenced to top of hole.
Figure 4:
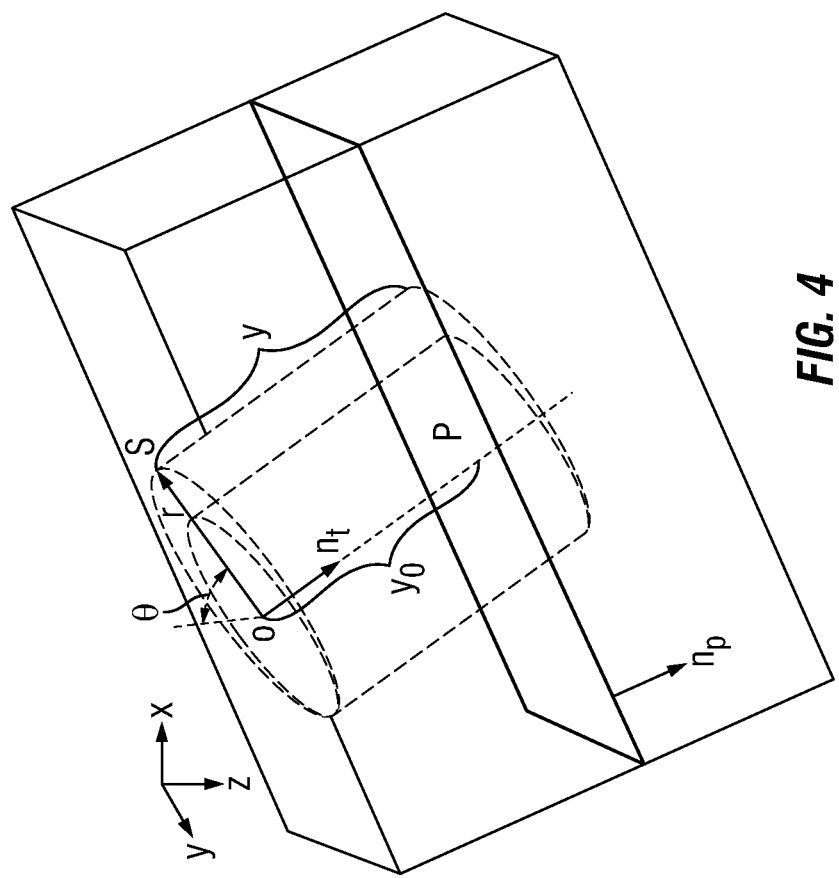
FIG. 4 is a schematic drawing of a logging scenario used to derive model for sinusoidal features in COMP image for an "ideal" tool as described in the text. At a given log-point 0, and sensor azimuth( ), the ideal tool measures the formation density within an infinitesimal volume-of-investigationS, located a radial distance EP L from the borehole wall.
Figure 6:
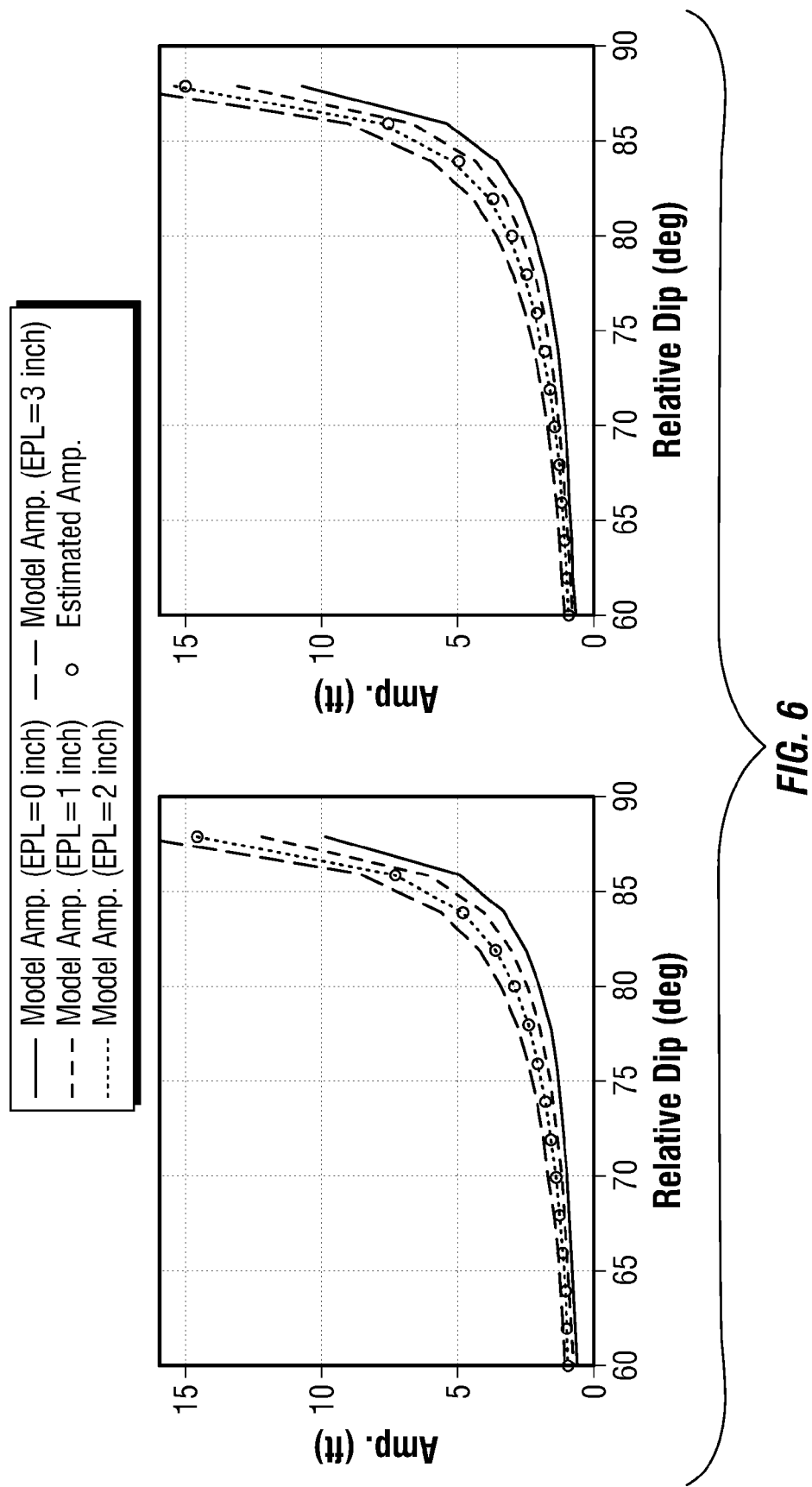
FIG. 6 are two plots of an EPL calibration for an 8.25 inch ECOSCOPE LWD™ tool.

Although the parametric model was derived for the case of the tool crossing a single planar boundary, it should be clear that if the tool crosses a sequence of planar boundaries, then the corresponding COMP image will be characterized by a sequence of sinusoidal contours, each with a different amplitude and phase depending on the local orientation of the layer boundary relative to the trajectory. Also, for a real tool with finite volume of investigation, we expect the sharp density jump in FIG. 5 to be smeared out over a thin "transition zone" near each layer boundary, with zone thickness dependent on the dimensions of the volume-of-investigation and on the physics of the measurement. Assuming that isocontours of the COMP image in each transition zone are described by the sinusoidal model we can estimate dip and azimuth of layer boundaries.

Sinusoid Extraction

Isocontours of the COMP image are computed using the "marching squares" algorithm, which is the 2D adaptation of the "marching cubes" algorithm for extracting isosurfaces from a 3D scalar field. To ensure that isocontours are extracted uniformly from the image, isocontours are computed for isovalues spanning the density range in the image, in increments of the measurement accuracy, 0.015 gfcc. Phase and amplitude for the extracted contours are determined using the least-squares method, by fitting each contour, denoted $y^{ls}_k(\theta)$ for k=1, ..., $N^{ls}$, to a sinusoidal model of the form $y_k^{model}(\theta) \equiv A_k \cos(\theta - \phi_k) + c_k$. Here $c_k$ is the location of the sinusoid in MD, $A_k$ is the sinusoid amplitude, and $\phi_k$ is the sinusoid phase.

Isocontours will not be exactly sinusoidal if the image contains noise, or if assumptions underlying the parametric model break down, for example, tool crossing a non-planar layer boundary, variable trajectory inclination and azimuth, or significant uncompensated borehole effects.

High-angle Well Model

The high-angle well model assumes that the trajectory can be discretized into segments such that the formation in each segment is 1D layering with constant dip and azimuth. The trajectory azimuth is assumed to be constant in each segment, and the trajectory inclination is assumed to be "down-section", with layers crossed at relative dip less than 90°, or "up-section", when layers are crossed at relative dip greater than 90°. FIG. 7 shows the formation for a typical down-section segment when viewed in the "curtain-section" plane, a vertical surface defined by the trajectory.

The free parameters for the segment are the apparent formation dip $\beta_a$, TVD location $z_j^{layers}$ of each layer boundary, layer densities $\rho_j^{layers}$, and layer photoelectric factors $PEF_j^{layers}$. The layer boundary locations may also be parameterized by their locations in MD, $l_j^{layers}$, which is a more stable parameterization due to the fact that the initial values for $l_j^{layers}$ are constrained from log-squaring, whereas the initial values of $z_j^{layers}$ are coupled to $l_j^{layers}$ via the initial value of the apparent formation dip $\beta_a$. The segment sizes, number of layers $N^{layers}$ and relative azimuth are determined and fixed from the data in a pre-processing step.

The segmented nature of the high-angle model allows it to capture variations in dip and layer properties along the trajectory. The efficiency of the high-angle parameterization degrades for relative dip close to 90°, where a separate approach is needed.

Horizontal Well Model

The horizontal well model also assumes discrete segments such that the formation in each segment is 1D layering with dip and azimuth, and such that the trajectory azimuth is constant in each segment. However, the horizontal well model constrains the layer boundaries in each segment to be parallel to the trajectory, i.e., constant relative dip 90°. FIG. 8 shows the model for a typical horizontal well segment when viewed in the curtain section. The model parameters for each segment are the distance $z_j^{layers}$ in TVD from the first log-point to each layer boundary, layer densities $\rho_j^{layers}$, and layer photoelectric factors $PEF_j^{layers}$. The number of segments, segment sizes and number of layers $N^{layers}$ in each segment are determined and fixed from the data in a pre-processing step.

The horizontal well model is applicable to intervals with variable relative dip close to 90°, i.e., with borehole parallel or near parallel to the surrounding formation layers. For all these intervals, segments must be chosen sufficiently small (not below the LS axial resolution) so that the model error in each segment—due to variable trajectory inclination or layer boundaries not parallel to the trajectory—corresponds to change in responses smaller than the data noise.

To estimate the contribution from model error, perfect synthetic data was generated using the fast-forward model and inverted using the horizontal well model with different segment sizes. For segment sizes 2 ft, the average reconstruction error in each segment was less than 0.015 g/cc for relative dip 88° to 92°.

Borehole Model

The mud properties, $\rho_{mud}$ and $PEF_{mud}$, are defined in the same trajectory segments used for the formation model, and are assumed to be uniform in each segment. The geometry of the borehole is defined in terms of the radial distance from the tool axis to the borehole wall, denoted by $r(\theta,MD)$, where $\theta$ is the tool azimuth. Given $r(\theta,MD)$, the corresponding stand-off $s(\theta,MD)$ is defined as $s(\theta,MD)=r(\theta,MD)-r_{tool}$, where $r_{tool}$ is the tool radius. For each segment, $r(\theta,MD)$ may be parameterized using one of the following models.

Cylindrical Geometry

The borehole in each segment is assumed to be a cylinder parameterized by the borehole radius $r_{BH}$ and the stand-off $s_{bot}$ at $\theta=180°$, as shown in FIG. 9. The radial distance of the borehole wall from the tool axis is $$r(\theta,MD)=\sqrt{d^2\sin^2\theta+r_{BH}^2}+d\cos\theta, \text{ and } d=r_{BH}-(r_{tool}+s_{bot}).$$

Staircase Geometry

The radial distance to the borehole wall is assumed to be piecewise-constant function of both $\theta$ and MD, defined by a discrete radius for each sector and each log-point.

Harmonic Geometry

The harmonic geometry can describe an arbitrary borehole surface. The radial distance to the borehole wall is a harmonic function of $\theta$:

$$r(\theta, MD) = a_0(MD) + \sum_{n=1}^{N} a_n(MD)\cos(n\theta) + b_n(MD)\sin(n\theta)$$

Here, the harmonic coefficients $a_0$, $a_n$ and $b_n$ for $n=1,2,\ldots N$, are piecewise-constant functions defined at each log point. For the data-sets considered in this paper, $N=2$ was found to be sufficient.

Figure 10:
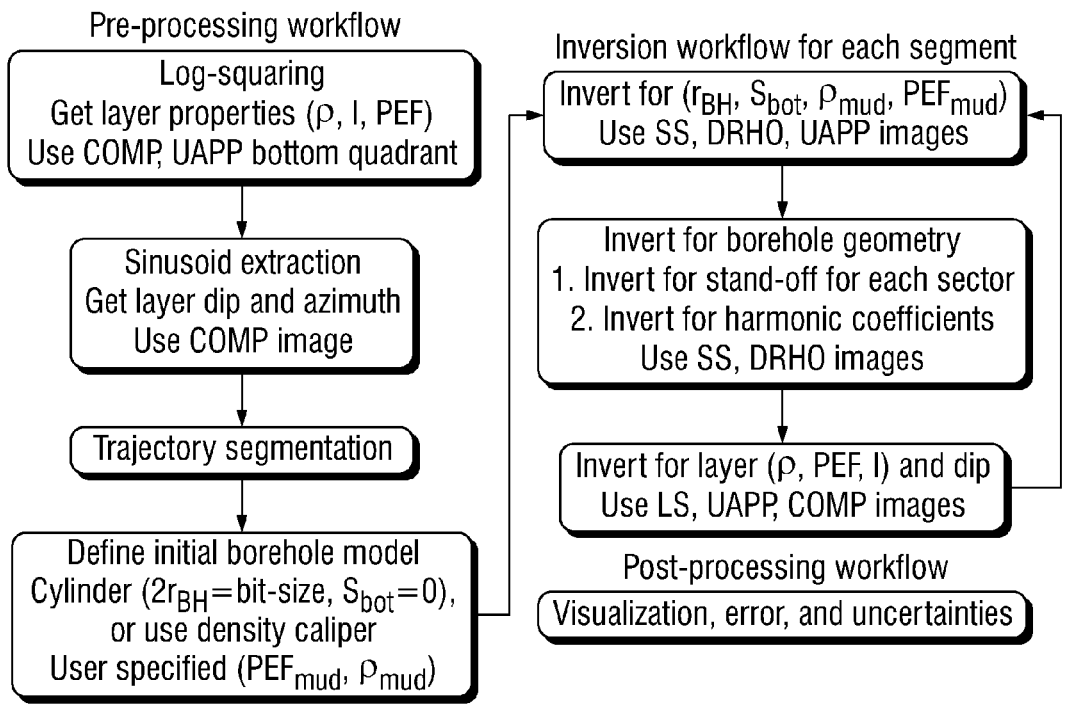
FIG. 10 is a flow chart of an inversion-based workflow for processing data with a high-angle well model.

Inversion-Based Workflows for Processing Nuclear Density Images in High-Angle Wells The steps for processing a high-angle interval are shown in FIG. 10.

Pre-processing Workflow for High-angle Wells

The high-angle pre-processing workflow consists of the following steps:

Log-Squaring—A log-squaring algorithm is applied to the bottom quadrant density (ROBB) log to construct a layered density profile along MD. A photoelectric factor for each layer is obtained by sampling the UAPP bottom quadrant log at the layer mid-points.

Sinusoid Extraction—The amplitude and phase of sinusoidal features corresponding to layer boundaries are extracted from the COMP image either manually, or by an automatic method. For each layer boundary, the extracted phase and amplitude are converted to relative dip and relative azimuth.

Trajectory Segmentation—An adaptive algorithm is used to discretize the trajectory such that the COMP image for each segment includes at least half a sinusoidal feature, which improves sensitivity to dip. The algorithm also constrains segment end-points to coincide with layer mid-points, so that each segment includes at least half of a layer, improving sensitivity to properties of truncated layers.

Definition of Initial Model—The output from log-squaring and sinusoid extraction is used to define the number of layers, their properties and boundaries, apparent formation dip, and relative azimuth for each segment. The layer boundaries from log-squaring must be shifted in MD in order to obtain their locations referenced to the tool axis. The initial borehole geometry is defined as a cylinder with diameter equal to the bit-size. Alternatively, the initial borehole geometry may also be defined using the density caliper. The initial mud density and mud photoelectric factor are specified by the user.

Inversion Workflow for High-angle Wells

As shown in FIG. 10, in each step of the inversion workflow, a subset of model parameters is optimized from a subset of channels which are selected based on their sensitivity to the parameters being optimized, resulting in a more robust workflow.

Gauss-Newton optimization with line search, adaptive regularization and parameter constraints is used to minimize the cost function, defined to be the weighted $L_2$-norm error between the measurements and the modeled responses over all log-points in a processing window (see below for definition of processing window). The weights in the cost function are the reciprocal of the measurement noise level for the channel used (0.015 g/cc for SS, LS, COMP, and 0.5 b/e– for UAPP). Measurements from all sectors are included with equal weights; no special weighting is applied to sectors from the bottom of the hole.

Inversion workflow steps are as follows:

1. Get initial model parameters for a segment from the output of pre-processing.

2. Assume cylindrical borehole geometry, and invert for the borehole radius and mud properties using the SS, DRHO, and UAPP channels for all sectors and log-points in the processing window.

3. Invert for the geometry of the borehole using the staircase or harmonic parameterization using the SS and DRHO channels for that log-point or sector.

4. Keep mud properties and borehole geometry fixed from previous steps. Invert for formation parameters using LS, COMP, and UAPP channels for all sectors and log-points in the processing window.

5. Repeat steps 2-4 until all parameters are converged to a specified tolerance, or until the specified maximum number of repetitions is reached.

Sliding Window Scheme

To enforce consistency of models between adjacent segments, for each segment, the model parameters are inverted from measurements in a processing window that includes all log-points in the segment, as well as log-points from buffer regions on each side of the segment. Formation layers from the previous and subsequent segments that influence measurements in the buffer regions are added to the formation model in each segment. The properties and thicknesses of the layers included from the previous segment are held fixed during the inversion.

Post-processing Workflow for High-angle Wells

The purpose of the post-processing workflow is to visualize the inversion results, and to compute various measures of the quality of the results. The formation model is visualized as a sequence of 1D multi-layer dipping formations in the curtain-section plane or as the inversion-based borehole-corrected image, which is obtained by projecting the layer properties in each segment onto a cylinder with radius $r_{tool}$+EPL, where EPL is the effective penetration length of the COMP channel. For quality control we can also visualize the inversion outputs, individual and average misfit for all measurements and sectors. If required, the uncertainties in the final model parameters for each segment may be estimated from the model covariance matrix.

Figure 11:
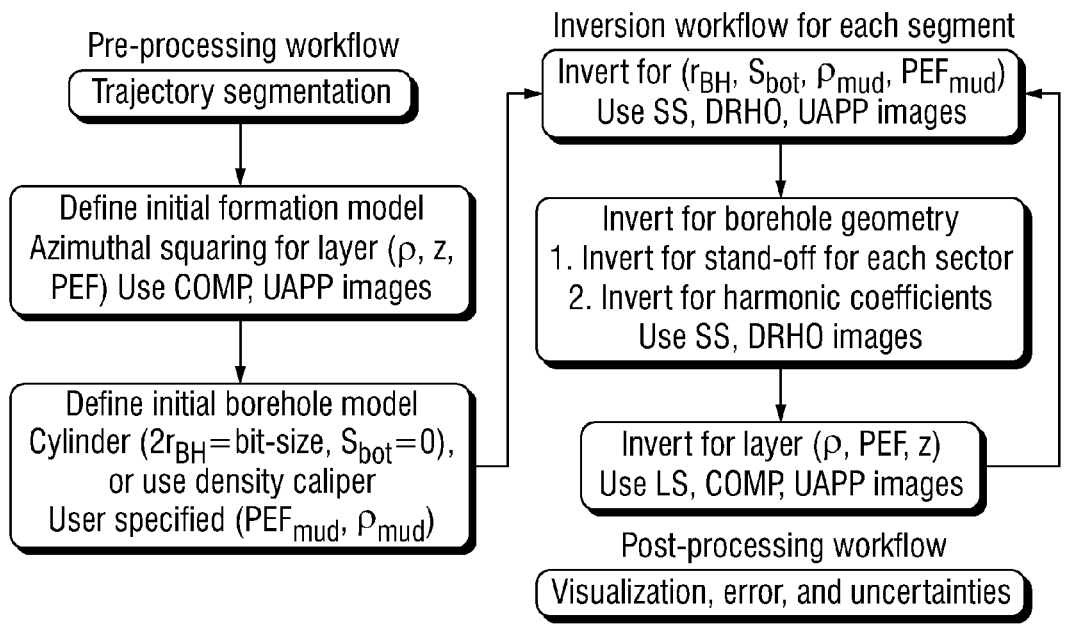
FIG. 11 is an inversion-based workflow for processing data using a horizontal well model.

Inversion-Based Workflows for Processing Nuclear Density Images in Horizontal Wells The steps for processing a horizontal interval are shown in FIG. 11 and are grouped in a similar manner to the high-angle workflow, with a pre-processing workflow, an inversion workflow, and a post-processing workflow.

Pre-processing Workflow for Horizontal Wells

Trajectory Segmentation

The segment sizes must be chosen so as to balance the opposing requirements of a small window size for minimizing model error, and a large window size for improving inversion robustness. Based on tests with perfect synthetic data described earlier, we use segment size of 2 ft in MD.

Definition of Initial Model

The assumption that the relative dip in each segment is close to 90° allows the approximate layer locations and densities to be derived from the width and density of each stripe in the COMP image by squaring the azimuthal response using the following algorithm:

1. Compute $\rho(\theta)$ by averaging the COMP image over the MD interval spanning the segment.

2. Extract phase by computing centroid of $\rho(\theta)$. Shift $\rho(\theta)$ to remove phase and symmetrize shifted response about $\theta=0°$.

3. Square symmetrized response in the interval from $\theta=[0°,180°]$, to obtain number of layers in segment, boundary locations $z_j^{layer}$ and layer densities $\rho_j^{layer}$.

4. Use the UAPP image to get layer photoelectric factors $PEF_j^{layer}$.

5. Map layer boundaries from $\theta$ to TVD: $z_j^{layer}=-(r_{tool}+EPL)\cos\theta_j^{layer}/\cos\beta_a$.

The initial parameters for the borehole model are defined using the same procedure described for the high-angle pre-processing workflow.

Inversion Workflow for Horizontal Wells

The steps in the horizontal well inversion workflow are similar to steps of the high-angle inversion workflow:

1. Obtain initial model parameters for a segment from the pre-processing output.

2. Invert for mud parameters and radius of cylindrical borehole using SS, UAPP, and DRHO channels.

3. Invert for borehole geometry parameters using SS and DRHO channels.

4. Invert for formation parameters using LS, UAPP, and COMP channels.

5. Repeat steps 2-4 until parameters converge, or until specified number of repetitions is reached.

Here also, the density images are processed segment by segment using a sliding window scheme analogous to the one used for the high-angle well workflow described earlier.

Post-processing Workflow for Horizontal Wells

The details of the horizontal well post-processing are similar to the high-angle well post-processing, with visualization of the formation model in the curtain-section plane, borehole-corrected image, and reconstructed images for all channels.

Validation on Synthetic Data Examples

High-angle Well Example: Noisy Data-set with Variable Rel. Dip from 82° to 87°

We tested the workflow on a formation model with dip $\beta_a=5°$ and zero azimuth) ($\alpha_r=0°$), with multiple layers of thicknesses 0.5 ft, 1 ft and 2 ft, and layer densities alternating between 1.95 g/cc and 2.6 g/cc, and photoelectric factor alternating between 1.49 b/e– and 2.9 b/e–. The borehole is a cylindrical, $r_{BH}=4.5$ inch, the bottom stand-off is zero ($s_{bot}=0$ inch), and the drilling mud is fresh water.

The 8.25 inch tool size was modeled over the 200 ft trajectory section with inclination varying linearly from 77° to 82°. Gaussian noise with zero mean and standard deviation of 0.02 g/cc, which is comparable to the amplitude of real measurement noise, was added to the synthetic measurements for all channels. The initial mud properties were set to their true values.

The output from the pre-processing workflow is shown in FIG. 12. Log-squaring and sinusoid extraction are used to build an initial segmented multi-layer formation model. The initial densities in the thin layers have errors due to shoulder-bed effect. The inverted, fully shoulder-bed corrected profile is shown in FIG. 13.

FIG. 14 shows the measured, initial, and final COMP density images, as well as reconstruction errors for the initial guess and the solution. The initial error shows large systematic discrepancies due to errors in the initial dip, initial layer densities and boundary locations obtained from log-squaring and sinusoid extraction. These discrepancies are corrected by the inversion. FIGS. 15 and 16 show the measured, initial, and final images for the LS and SS densities, and corresponding error images. The initial error shows similar systematic discrepancies as the initial error for the COMP channel. In addition, due to the sensitivity of the LS and SS channels to borehole effects, there are large systematic discrepancies near the top of the hole due to the error in the initial borehole geometry. These discrepancies are absent from the final error due to the reconstruction of the borehole geometry.

The standoff from the inversion is shown in FIG. 17. The final errors appear random for all channels and the mean and standard deviation of the error for each sector is shown in FIG. 18. The errors are comparable to the measurement noise, which confirms the accuracy of the inversion for this data-set. FIG. 19 shows the borehole-corrected image and final formation model in the curtain-section view.

Horizontal Well Example 1: Noisy Data-set with Constant Rel. Dip 89°

We tested the horizontal well workflow on a formation model with multiple thin layers of thickness 0.75 ft and 0.5 ft, and layer densities alternating between 1.95 g/cc and 2.6 g/cc, photoelectric factor alternating between 1.49 b/e− and 2.9 b/e−, and zero dip ($\beta_a=\alpha_r=0°$). The borehole is cylindrical, $r_{BH}$=4.5 inch, the bottom stand-off is zero, and the drilling mud is fresh water. The 8.25 inch tool size was modeled over the 200 ft of trajectory at constant inclination of 89°. Gaussian noise with standard deviation equal to the accuracy of the fast-forward model was added to the measurements.

The reconstruction of COMP, LS and SS density images by the inversion is shown in FIGS. 18-20. The results in curtain section view are shown in FIG. 21, along with the final borehole and shoulder-bed corrected density image. We observe consistent reconstruction of boundaries. Boundaries are detected before crossing, and as expected they are more accurate for lower beds than for upper beds, where there is a possibility of ambiguity between the boundary and large standoff in the 9.0 inch diameter borehole.

Horizontal Well Example 2: Noisy Data-set with Sinusoidal Rel. Dip 88°-92°

We tested the horizontal well workflow on a 320 ft long section of trajectory with variable inclination from 88° to 92°, with the build/drop rate 1° per 20 ft, in a test formation with zero dip ($\beta_a=\alpha_r=0°$) traversing a sequence of layers 0.5, 0.75, 1 and 2 ft thick, with density alternating between 1.95 g/cc and 2.6 g/cc, and photoelectric factor alternating between 1.49 b/e− and 2.9 b/e−. The borehole is a cylinder with $r_{BH}$=4.5 inch, the tool is 8.25 inch size, with zero bottom stand-off ($s_{bot}$=0 inch), and the drilling mud is fresh water. Gaussian noise with zero mean and standard deviation equal to the accuracy of the fast-forward model was added to the measurements for each channel. The results of the inversion are shown in FIGS. 22-23.

Field Examples

High-angle Well Example: North Sea Data Set

We apply the high-angle workflow to a 180 ft interval from a data-set acquired in a North Sea field, for which the COMP image is characterized by a sequence of down-section sinusoidal features. FIG. 24 shows the output from pre-processing, as a result of which the trajectory has been discretized into segments with a 1D multi-layer formation in each segment. The initial borehole was assumed to be a cylinder with diameter equal to the bit-size of 8.5 inch, and the initial mud density and mud PEF were set to 1.4 g/cc and 10 b/e−, respectively.

FIG. 25 shows the reconstructed COMP bottom quadrant log, and final layer profile, dip, and azimuth. Note the shoulder-bed corrections in thin layers and corrections to the initial dip of approximately 1°.

FIGS. 26-28 show the reconstructed images for the COMP, LS and SS density channels, as well as the corresponding errors. COMP image reconstruction shows that errors are reduced in all quadrants due to optimization of the layer properties, thicknesses, and dip. Final errors are less than 5%, and are larger in the upper quadrant relative to the bottom quadrant, possibly due to inaccuracies in the mud properties or lower accuracy of fast-forward model for the large standoff. LS and SS reconstruction is similar, but in addition, significant reduction in the initial error in the upper quadrant is seen due to optimization of the borehole geometry.

FIG. 29 shows the average and standard deviation of the reconstruction error for each sector. The final average error is less than 0.03 g/cc for all channels over all sectors, with close to zero average error in the bottom quadrant. The final standard deviation of the error is less than 0.03 g/cc for all channels in all sectors.

FIG. 30 shows the final borehole geometry, which was parameterized using a harmonic model with two harmonics in the expansion. The same figure also shows the geometry from the density caliper. The density caliper has sinusoidal artifacts whose locations correlate with layers in the COMP image. These artifacts are not present in the geometry from the inversion. FIG. 31 shows the final borehole-corrected image and final formation model in the curtain-section view.

Field Data-set from a Gas Shale Well

We apply the high-angle workflow to a 100 ft down-section interval of the data-set acquired in the Marcellus gas shale well in NE Pennsylvania. FIG. 32 shows the output from pre-processing, where the trajectory has been discretized into segments with associated initial 1D multi-layer formation in each segment. The initial borehole geometry was assumed to be a cylinder with diameter equal to the bit-size (8.5 inch), and the mud density and mud PEF were set to 1.4 g/cc and 50 b/e−, respectively.

FIG. 33 shows the reconstructed layered density profile, dip, and azimuth. The reconstructed dip is corrected up to 2° compared to initial guess.

FIG. 34 shows the measured, initial, and final images for the COMP channel, as well as the initial and final errors. FIG. 35-36 show the measured, initial, and final images for the LS and SS channels, as well as the initial and final errors. FIG. 37 shows the average and standard deviation of the initial and final errors for each sector. The inversion significantly reduces the mismatch between modeling and the measurements. FIG. 38 shows the final borehole geometry.

FIG. 39 shows the final borehole-corrected image and final formation model in the curtain-section plane.

Horizontal Well Example: North Sea Data Set

We apply the horizontal well workflow to 350 ft long data interval from a North Sea field. The initial mud density and mud photoelectric factor were set to 1.4 g/cc and 10 b/e−, respectively.

The measured COMP image, the initial guess, inversion reconstructed image and corresponding misfit are shown in FIG. 40. FIG. 41 shows the average and standard deviation of the initial and final errors for each sector. The inversion significantly reduces the mismatch between modeling and the measurements. Borehole geometry in terms of standoff is shown in FIG. 42. Initial geometry was cylinder with 8.5 inch diameter. Harmonic parameterization with two harmonics in the expansion was used. The inversion-based caliper does not have sinusoidal artifacts at MD=100-180 ft.

FIG. 43 bottom track shows the final formation model in the curtain-section plane. The green curve is the tool trajectory and the dashed green curves are the borehole surfaces.

The invention claimed is:

1. A method for characterizing a subterranean formation traversed by a borehole, the method comprising:
    collecting data in a borehole section for the formation using a nuclear density tool or sensor, wherein the data includes long spacing density data and short spacing density data, and wherein both the long spacing density data and the short spacing density data are combined to form density images of the formation as a function of azimuth around the tool or sensor;
segmenting the borehole section into a plurality of segments based on features of said density images of the formation;
identifying a segment of said plurality of segments as a high angle segment;
defining an initial formation model of the formation for said high angle segment;
defining an initial borehole model for said high angle segment, wherein the borehole model comprises a standoff distance between the tool or sensor and a wall of the borehole, the standoff distance varying as a function of azimuth around the tool or sensor; and
for said high angle segment, performing inversion operations using the initial formation model, the initial borehole model, and the density images to determine at least one formation parameter for the formation;
wherein the inversion operations involve:
 i) inverting for borehole geometry of said high angle segment using at least short spacing density data for said high angle segment, wherein the borehole geometry of said high angle segment is defined in terms of the standoff distance between the tool or sensor and the wall of the borehole as a function of azimuth, and
 ii) inverting for at least one formation parameter using at least long spacing density data for said high angle segment.

2. The method of claim 1, wherein the at least one formation parameter comprises at least one of layer density, layer photoelectric factor, layer thickness, and layer dip.

3. The method of claim 1, wherein:
the data further includes compensated density data and volumetric photoelectric factor data; and
the inverting for at least one formation parameter of ii) also uses the compensated density data and volumetric photoelectric factor data for said high angle segment.

4. The method of claim 1, wherein:
the data further includes differential density data; and
the inverting for borehole geometry of said high angle segment of i) also uses the differential density data for said high angle segment.

5. The method of claim 1, wherein:
the data further includes differential density data and volumetric photoelectric factor data; and
the inversion operations further include iii) inverting for at least mud property using at least short spacing density data, differential density data and volumetric photoelectric factor data for said high angle segment.

6. The method of claim 5, wherein the at least one mud property comprises at least one of mud density and mud photoelectric factor.

7. The method of claim 1, wherein the density images of the formation each comprise a plurality of sectors of varying azimuth.

8. The method of claim 1, wherein the density tool is a nuclear density tool.

9. The method of claim 8, wherein the nuclear density tool is a nuclear gamma-gamma density tool.

10. The method of claim 1, wherein a presence of sinusoidal features in said density images is used to identify said borehole segment as a high-angle segment.

11. The method of claim 1, wherein defining the initial formation model for the formation comprises applying log-squaring to the density images to determine at least one layer property selected from the group consisting of: formation density, formation thickness, and formation photoelectric factor.

12. The method of claim 10, further comprising using the sinusoidal features in said density images to discretize a borehole trajectory into a plurality of segments, and selectively classifying the plurality of segments as high angle segments based on phases and amplitudes of said sinusoidal features.

13. The method of claim 10, wherein the sinusoidal features are extracted by calculating contours for the density images and fitting a sinusoidal function to each contour.

14. The method of claim 13, wherein relative dip of a segment is determined from phase and amplitude of the sinusoidal function.

15. A method for characterizing a subterranean formation traversed by a borehole, the method comprising:
collecting data in a borehole section for the formation using a nuclear density tool or sensor, wherein the data includes long spacing density data and short spacing density data, and wherein both the long spacing density data and the short spacing density data are combined to form density images of the formation as a function of azimuth around the tool or sensor;
segmenting the borehole section into a plurality of segments based on features of said density images of the formation;
identifying a segment of said plurality of segments as a horizontal segment;
defining an initial formation model of the formation for said horizontal segment;
defining an initial borehole model for said horizontal segment, wherein the initial borehole model comprises a standoff distance between the tool or sensor relative to a wall of the borehole, the standoff distance varying as a function of azimuth around the tool or sensor; and
for said horizontal segment, performing inversion operations using the initial formation model, the initial borehole model, and the density images to determine at least one formation parameter for the formation;
wherein the inversion operations involve:
 i) inverting for borehole geometry of said horizontal segment using at least short spacing density data for said horizontal segment, wherein the borehole geometry of said horizontal segment is defined in terms of the standoff distance between the tool or sensor and the wall of the borehole as a function of azimuth, and
 ii) inverting for at least one formation parameter using at least long spacing density data for said horizontal segment.

16. The method of claim 15, wherein defining the initial formation model for the formation comprises applying log-squaring to the density images to determine at least one layer property selected from the group consisting of: formation density, formation thickness, and formation photoelectric factor.

17. The method of claim 15, wherein the at least one formation parameter comprises at least one of layer density, layer photoelectric factor, layer thickness, and layer dip.

18. The method of claim 15, wherein:
the data further includes compensated density data and volumetric photoelectric factor data; and
the inverting for at least one formation parameter of ii) also uses the compensated density data and volumetric photoelectric factor data for said horizontal segment.

19. The method of claim 15, wherein:
the data further includes differential density data; and
the inverting for borehole geometry of said horizontal segment of i) also uses the differential density data for said horizontal segment.

20. The method of claim 15, wherein:

the data further includes differential density data and volumetric photoelectric factor data; and the inversion operations further include iii) inverting for at least mud property using at least short spacing density data, differential density data and volumetric photoelectric factor data for said horizontal segment.

21. The method of claim 15, wherein:

each segment is a one-dimensional layer structure with constant dip and azimuth.

22. The method of claim 1, wherein:

each segment is a one-dimensional layer structure with constant dip and azimuth.

* * * * *